US009842049B2

United States Patent
Fukumoto

(10) Patent No.: US 9,842,049 B2
(45) Date of Patent: Dec. 12, 2017

(54) DATA DEPLOYMENT DETERMINATION APPARATUS, DATA DEPLOYMENT DETERMINATION PROGRAM, AND DATA DEPLOYMENT DETERMINATION METHOD

(71) Applicant: FUJITSU LIMITED, Kawasaki-shi, Kanagawa (JP)

(72) Inventor: Naoto Fukumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 15/002,447

(22) Filed: Jan. 21, 2016

(65) Prior Publication Data

US 2016/0253106 A1    Sep. 1, 2016

(30) Foreign Application Priority Data

Feb. 27, 2015 (JP) ................................. 2015-037533

(51) Int. Cl.
  *G06F 12/08* (2016.01)
  *G06F 12/0802* (2016.01)
  *G06F 11/34* (2006.01)

(52) U.S. Cl.
  CPC .......... *G06F 12/0802* (2013.01); *G06F 11/34* (2013.01); *G06F 12/08* (2013.01); *G06F 2212/1016* (2013.01); *G06F 2212/2542* (2013.01); *G06F 2212/60* (2013.01)

(58) Field of Classification Search
  CPC ....... G06F 11/34; G06F 12/0802; G06F 12/08
  USPC ........................................................ 711/118
  See application file for complete search history.

(56) References Cited

U.S. PATENT DOCUMENTS

| 6,324,599 | B1 * | 11/2001 | Zhou ....................... | G06F 13/28 710/22 |
| 8,694,757 | B2 * | 4/2014 | Khailany ................. | G06F 8/453 712/227 |
| 2007/0011420 | A1 * | 1/2007 | Boss ....................... | G06F 3/0605 711/165 |
| 2007/0201318 | A1 * | 8/2007 | Masaki .............. | G11B 7/08505 369/30.1 |
| 2008/0301697 | A1 * | 12/2008 | Southgate ............... | G06F 8/453 718/105 |

(Continued)

FOREIGN PATENT DOCUMENTS

| JP | 7-191882 A | 7/1995 |
| JP | 2012-247827 A | 12/2012 |

*Primary Examiner* — Pierre-Michel Bataille
(74) *Attorney, Agent, or Firm* — Fujitsu Patent Center

(57) ABSTRACT

A data deployment determination apparatus includes a correlation information creation processor that creates correlation information in which addresses indicating areas in a first memory are correlated with frequency information on memory accesses for the respective addresses, from trace information on a memory access to the first memory, a time reduction calculation processor that calculates, for each of the addresses, time reduction in memory accesses to data stored in the first memory based on the correlation information when data stored in the first memory is stored in a second memory which is a memory having a larger bandwidth than the first memory, and a data deployment determination processor that determines that first data stored in the address of which the time reduction is larger than the time reduction corresponding to second data stored in the address is to be stored in the second memory in preference to the second data.

9 Claims, 32 Drawing Sheets

(56) References Cited

U.S. PATENT DOCUMENTS

2015/0121024 A1* 4/2015 Kolvick ............... G06F 3/0647
                                                      711/162

* cited by examiner

FIG. 3

TRACE INFORMATION

| NUMBER | TIME | ADDRESS | SIZE |
|---|---|---|---|
| 1 | 0001 | 0x00001000 | 8 |
| 2 | 0003 | 0x00000010 | 8 |
| 3 | 0004 | 0x00000018 | 8 |
| 4 | 0005 | 0x00000020 | 8 |
| 5 | 0006 | 0x00000028 | 8 |
| 6 | 0006 | 0x00000078 | 8 |
| 7 | 0009 | 0x00001000 | 8 |
| 8 | 0012 | 0x00001060 | 8 |
| 9 | 0013 | 0x20000180 | 8 |
| 10 | 0014 | 0x20000188 | 8 |
| 11 | 0019 | 0x00001000 | 8 |

FIG. 4

CORRELATION INFORMATION

| NUMBER | ADDRESS | ACCESS FREQUENCY |
|---|---|---|
| 1 | 0x00001000 | 3 |
| 2 | 0x00000000 | 2 |
| 3 | 0x00000020 | 2 |
| 4 | 0x20000180 | 2 |
| 5 | 0x00001060 | 1 |
| 6 | 0x00000078 | 1 |

FIG. 13

CORRELATION INFORMATION 134

| NUMBER | ADDRESS | ACCESS FREQUENCY | SIZE |
|---|---|---|---|
| 1 | 0x00001000 | 1 | 8 |

FIG. 14

CORRELATION INFORMATION 134

| NUMBER | ADDRESS | ACCESS FREQUENCY | SIZE |
|---|---|---|---|
| 1 | 0x00001000 | 1 | 8 |
| 2 | 0x00000010 | 1 | 32 |

FIG. 15

CORRELATION INFORMATION 134

| NUMBER | ADDRESS | ACCESS FREQUENCY | SIZE |
|--------|------------|------------------|------|
| 1 | 0x00001000 | 3 | 8 |
| 2 | 0x00000010 | 1 | 32 |
| 3 | 0x00000078 | 1 | 8 |
| 4 | 0x20000180 | 1 | 16 |
| 5 | 0x00001060 | 1 | 8 |

FIG. 16

CORRELATION INFORMATION 134

| NUMBER | ADDRESS | ACCESS FREQUENCY | SIZE | TIME REDUCTION |
|---|---|---|---|---|
| 1 | 0x00001000 | 3 | 8 | 0 |
| 2 | 0x00000010 | 1 | 32 | |
| 3 | 0x00000078 | 1 | 8 | |
| 4 | 0x20000180 | 1 | 16 | |
| 5 | 0x00001060 | 1 | 8 | |

FIG. 17

CORRELATION INFORMATION 134

| NUMBER | ADDRESS | ACCESS FREQUENCY | SIZE | TIME REDUCTION |
|---|---|---|---|---|
| 1 | 0x00001000 | 3 | 8 | 0 |
| 2 | 0x00000010 | 1 | 32 | 4.5 |
| 3 | 0x00000078 | 1 | 8 | |
| 4 | 0x20000180 | 1 | 16 | |
| 5 | 0x00001060 | 1 | 8 | |

FIG. 18

CORRELATION INFORMATION 134

| NUMBER | ADDRESS | ACCESS FREQUENCY | SIZE | TIME REDUCTION |
|--------|---------|------------------|------|----------------|
| 1 | 0x00001000 | 3 | 8 | 0 |
| 2 | 0x00000010 | 1 | 32 | 4.5 |
| 3 | 0x00000078 | 1 | 8 | 0 |
| 4 | 0x20000180 | 1 | 16 | 1.5 |
| 5 | 0x00001060 | 1 | 8 | 0 |

FIG. 19

INSTRUCTION INFORMATION 135

| NUMBER | ADDRESS | ACCESS FREQUENCY | SIZE | TIME REDUCTION |
|---|---|---|---|---|
| 2 | 0x00000010 | 1 | 32 | 4.5 |

FIG. 20

INSTRUCTION INFORMATION 135

| NUMBER | ADDRESS | ACCESS FREQUENCY | SIZE | TIME REDUCTION |
|---|---|---|---|---|
| 2 | 0x00000010 | 1 | 32 | 4.5 |
| 4 | 0x20000180 | 1 | 16 | 1.5 |

FIG. 27

TRACE INFORMATION 132

| NUMBER | TIME | ADDRESS | SIZE |
|---|---|---|---|
| 2 | 0003 | 0x00000010 | 8 |
| 3 | 0004 | 0x00000018 | 8 |
| 4 | 0005 | 0x00000020 | 8 |
| 5 | 0006 | 0x00000028 | 8 |
| 6 | 0006 | 0x00000078 | 8 |
| 1 | 0001 | 0x00001000 | 8 |
| 7 | 0009 | 0x00001000 | 8 |
| 8 | 0012 | 0x00001060 | 8 |
| 9 | 0013 | 0x20000180 | 8 |
| 10 | 0014 | 0x20000188 | 8 |
| 11 | 0019 | 0x00001000 | 8 |

FIG. 28

TRACE INFORMATION 132

| NUMBER | TIME | ADDRESS | SIZE |
|---|---|---|---|
| 2 | 0003 | 0x00000010 | 8 |
| 3 | 0004 | 0x00000018 | 8 |
| 4 | 0005 | 0x00000020 | 8 |
| 5 | 0006 | 0x00000028 | 8 |
| 6 | 0006 | 0x00000078 | 8 |
| 1 | 0001 | 0x00001000 | 8 |
| 7 | 0009 | 0x00001000 | 8 |
| 8 | 0012 | 0x00001060 | 8 |
| 11 | 0019 | 0x00001000 | 8 |
| 9 | 0013 | 0x20000180 | 8 |
| 10 | 0014 | 0x20000188 | 8 |

FIG. 29

CORRELATION INFORMATION 134

| NUMBER | ADDRESS | ACCESS FREQUENCY | SIZE |
|---|---|---|---|
| 1 | 0x00000000 | 5 | 40 |

FIG. 30

CORRELATION INFORMATION 134

| NUMBER | ADDRESS | ACCESS FREQUENCY | SIZE |
|---|---|---|---|
| 1 | 0x00000000 | 5 | 40 |
| 2 | 0x00001000 | 2 | 16 |
| 3 | 0x00001000 | 2 | 16 |
| 4 | 0x20000000 | 2 | 16 |

FIG. 31

CORRELATION INFORMATION 134

| NUMBER | ADDRESS | ACCESS FREQUENCY | SIZE | TIME REDUCTION |
|---|---|---|---|---|
| 1 | 0x00000000 | 5 | 40 | 58 |
| 2 | 0x00001000 | 2 | 16 | |
| 3 | 0x00001000 | 2 | 16 | |
| 4 | 0x20000000 | 2 | 16 | |

FIG. 32

CORRELATION INFORMATION 134

| NUMBER | ADDRESS | ACCESS FREQUENCY | SIZE | TIME REDUCTION |
|---|---|---|---|---|
| 1 | 0x00000000 | 5 | 40 | 58 |
| 2 | 0x00001000 | 2 | 16 | 22 |
| 3 | 0x00001000 | 2 | 16 | 22 |
| 4 | 0x20000000 | 2 | 16 | 22 |

DATA DEPLOYMENT DETERMINATION APPARATUS, DATA DEPLOYMENT DETERMINATION PROGRAM, AND DATA DEPLOYMENT DETERMINATION METHOD

CROSS-REFERENCE TO RELATED APPLICATION

This application is based upon and claims the benefit of priority of the prior Japanese Patent Application No. 2015-037533, filed on Feb. 27, 2015, the entire contents of which are incorporated herein by reference.

FIELD

The present invention relates to a data deployment determination apparatus, a data deployment determination program, and a data deployment determination method.

BACKGROUND

A non-uniform memory access (NUMA) architecture in which a processor accesses a plurality of memories of which the access speeds are different is employed as an architecture that a physical machine employs.

In a physical machine that employs the NUMA architecture, data of which the access frequency of a processor is high is deployed in a memory of which the response period corresponding to a memory access request is short. In this way, a physical machine that employs the NUMA architecture can improve the overall memory access efficiency of the physical machine (that is, the response period to a memory access request can be shortened) (for example, see Japanese Laid-open Patent Publication No. 2012-247827 and Japanese Laid-open Patent Publication No. H7-191882).

SUMMARY

The response period is calculated by adding the value of latency based on a physical distance or the like between a processor and a memory to a value obtained by dividing the size of memory access target data by a memory bandwidth (a data transmission speed or a data transmission amount per unit period). Moreover, the value obtained by dividing the size of the memory access target data by the memory bandwidth decreases as the size of the memory access target data decreases. Thus, in this case, the response period depends on the value of latency. Thus, in this case, the physical machine can improve the memory access efficiency by storing data of which the access frequency is high in a memory of which the value of latency is small.

On the other hand, the larger the value obtained by dividing the size of the memory access target data by the memory bandwidth increases as the size of the memory access target data increases. Thus, in this case, the response period depends on the bandwidth more than the value of latency. Thus, depending on the size of the memory access target data, the result of data deployment determined based on the value of latency only may be different from the result of data deployment determined by taking the value obtained by dividing the data size by the bandwidth also into consideration. That is, a physical machine may need to calculate the response period based on the size of data that each memory actually performs the memory access.

Here, for example, when a processor performs memory accesses by putting a plurality of memory access requests together, the trace that a processor outputs according to execution of a program is output as if the memory access is performed without putting the plurality of memory access requests together. Thus, when data deployment is determined between a plurality of memories based on the trace information, the information of the memory access performed by putting the plurality of memory access requests together is not reflected on the determination of data deployment. Thus, in this case, the physical machine is not able to determine the data deployment based on the size of the actual memory access target data and thus is not able to improve the memory access efficiency.

According to an aspect of the embodiments, a data deployment determination apparatus includes a correlation information creation processor that creates correlation information in which addresses indicating areas in a first memory, in which data subjected to memory accesses is stored, are correlated with frequency information on memory accesses for the respective addresses, from trace information on a memory access to the first memory, a time reduction calculation processor that calculates, for each of the addresses, time reduction in memory accesses to data stored in the first memory based on the correlation information when data stored in the first memory is stored in a second memory which is a memory having a larger bandwidth than the first memory, and a data deployment determination processor that determines that first data stored in the address of which the time reduction is larger than the time reduction corresponding to second data stored in the address is to be stored in the second memory in preference to the second data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram for describing a specific example of the trace information.

FIG. 4 is a diagram for describing a specific example of correlation information.

FIG. 13 is a specific example of the correlation information 134.

FIG. 14 is a specific example of the correlation information 134.

FIG. 15 is a specific example of the correlation information 134.

FIG. 16 is a specific example of the correlation information 134.

FIG. 17 is a specific example of the correlation information 134.

FIG. 18 is a specific example of the correlation information 134.

FIG. 19 is a specific example of the instruction information 135.

FIG. 20 is a specific example of the instruction information 135.

FIG. 27 is a specific example of the trace information 132.

FIG. 28 is a specific example of the trace information 132.

FIG. 29 is a specific example of the correlation information 134.

FIG. 30 is a specific example of the correlation information 134.

FIG. 31 is a specific example of the correlation information 134.

FIG. 32 is a specific example of the correlation information 134.

DESCRIPTION OF EMBODIMENTS

[Configuration of Information Processing System]

Figure 1:
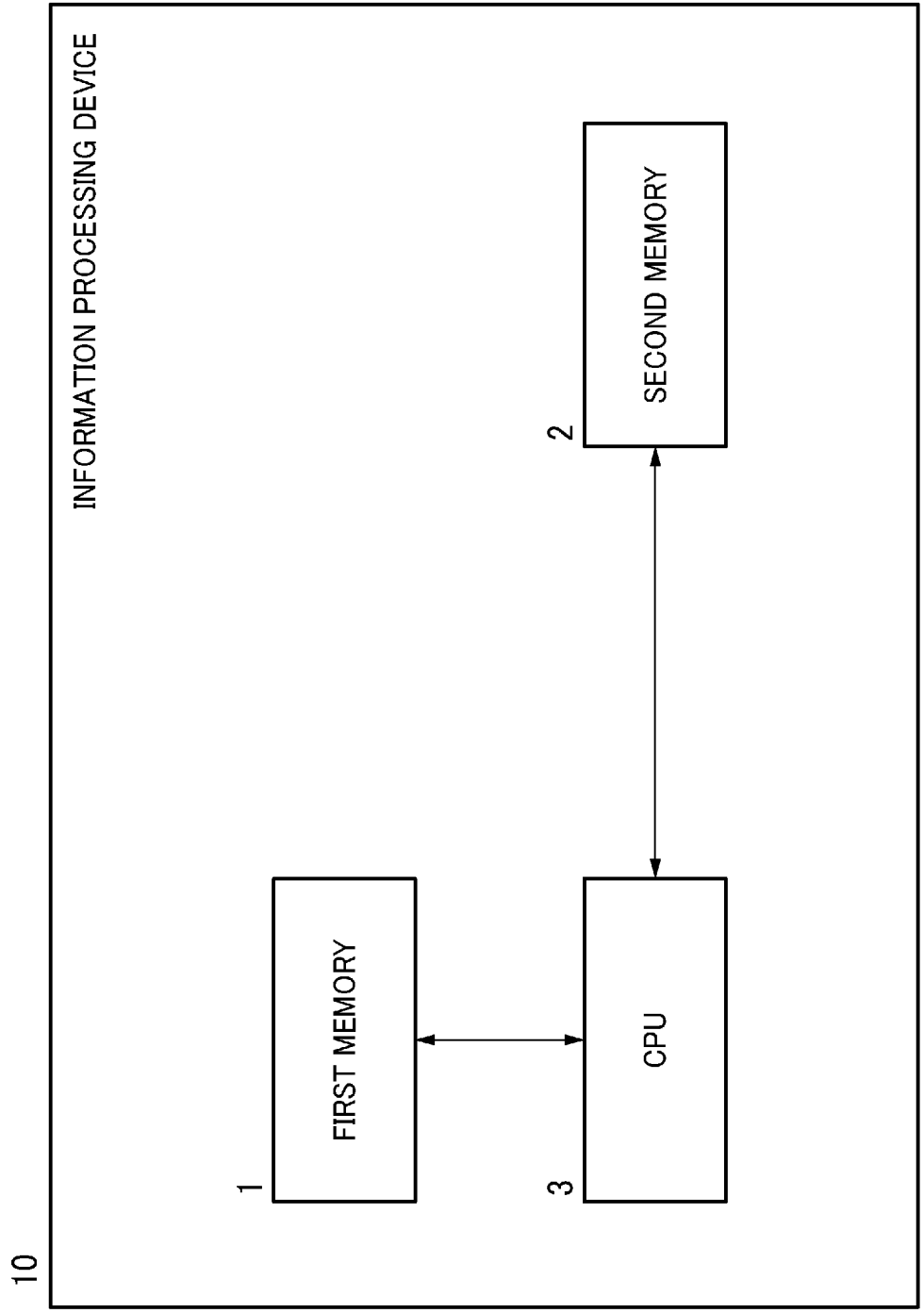
FIG. 1 is a diagram illustrating an entire configuration of an information processing device 10.

FIG. 1 is a diagram illustrating an entire configuration of an information processing device 10. The information processing device 10 (hereinafter also referred to as a data deployment determination device 10 or a data deployment determination apparatus 10) illustrated in FIG. 1 is a physical machine that constructs a business system for providing services to users, for example. The information processing device 10 includes a central processing unit (CPU) 3 which is a processor and a first memory 1 and a second memory 2 that the CPU 3 can access.

In the example illustrated in FIG. 1, the second memory 2 is a memory having a larger bandwidth than the first memory 1, for example. Specifically, the first memory 1 is a double-data-rate synchronous dynamic random access memory (DDR SDRAM), for example, and the second memory 2 is a three-dimensional stacked memory, for example.

Figure 2:
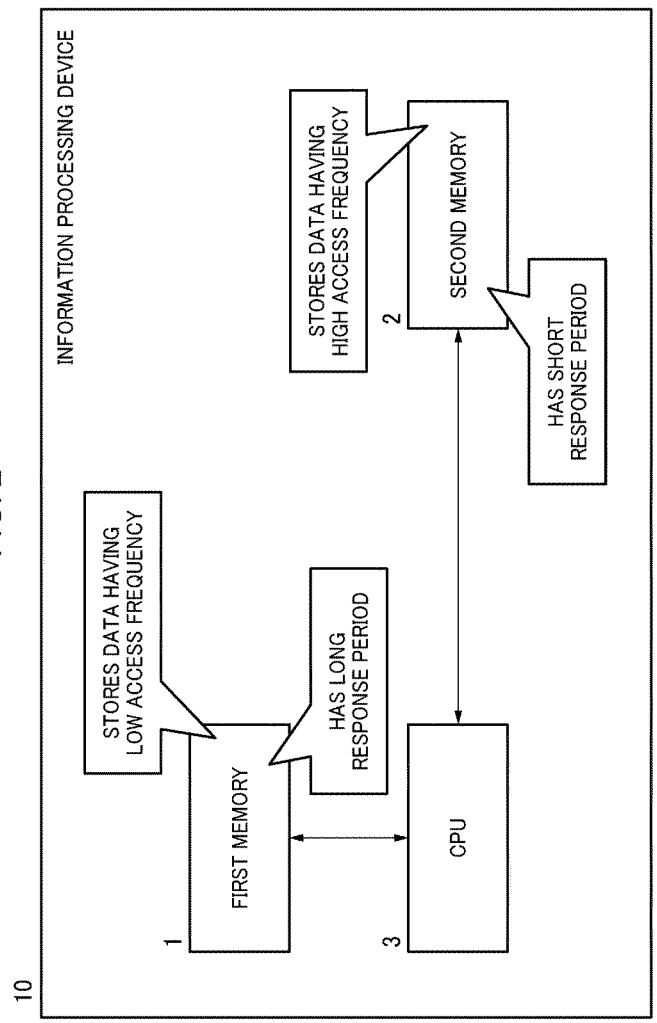
FIG. 2 is a diagram illustrating an entire configuration of an information processing device 10.

The information processing device 10 illustrated in FIG. 1 employs the NUMA architecture, for example. In this case, as illustrated in FIG. 2, for example, an operating system (OS) (not illustrated) of the information processing device 10 preferentially stores data of which the access frequency is high in a memory (the second memory 2) of which the response period corresponding to a memory access is short.

The response period of the memory access is calculated by Expression (1).

$$T=x/B+L \qquad (1)$$

In Expression (1), "x" is the size of memory access target data. Moreover, "B" is the bandwidth of a memory (the first memory 1 or the second memory 2), and "L" is the value of latency (the value of a delay period when the CPU 3 communicates with the memory). Moreover, "T" is a response period needed for the CPU 3 to perform memory access to the memory.

In Expression (1), when the value "x" Is small, the value obtained by dividing the value "x" by the value "B" decreases and "T" depends largely on the value "L" Thus, in this case, the information processing device 10 can improve the memory access efficiency by storing data of which the access frequency is high in a memory of which the delay period is small.

On the other hand, in Expression (1), when the value "x" is large, the value obtained by dividing the value "x" by the value "B" Increases, and for example, "T" depends on the value obtained by dividing the value "x" by the value "B" rather than the value "L" Thus, in this case, the information processing device 10 needs to determine a memory in which items of data are to be stored by taking the memory bandwidth also into consideration as well as the delay period. That is, the information processing device 10 needs to determine a memory in which items of data are to be stored based on the size of the actual memory access target data of the memory.

[Specific Example of Trace Information]

Next, trace information referred to when the information processing device 10 calculates the access frequency will be described.

The information processing device 10 performs a test operation based on test data before starting a real operation (an operation for providing services to users) of the information processing device 10, for example, and outputs information on memory accesses occurred according to the test operation as trace information. The information processing device 10 calculates the access frequency based on the output trace information.

FIG. 3 is a diagram for describing a specific example of the trace information. The trace information illustrated in FIG. 3 includes, as its items, a "number" for identifying respective items of information included in the trace information, a "time" indicating the time at which a memory access occurred, and an "address" indicating the address in which the data subjected to memory access is stored. Moreover, the trace information illustrated in FIG. 3 includes, as its item, a "size" Indicating the size of the data subjected to memory access. The information set in the "address" is in a hexadecimal notation. Moreover, in the following description, it is assumed that the unit of information set in the "time" Is msec (milliseconds) and the unit of information set in the "size" is B (bytes).

Specifically, in the row corresponding to the "number" of "1", of the trace information illustrated in FIG. 3, "0001" is set as the "time" "0x00001000" is set as the "address", and "8 (bytes)" is set as the "size" That is, the row corresponding to the "number" of "1" indicates that a memory access is executed on the data stored in the area of "8 (bytes)" starting from the address "0x00001000" when the "time" is "0001". The description of the other information in FIG. 3 will be omitted.

Next, FIG. 4 is a diagram for describing a specific example of correlation information. The correlation information is information that summarizes the number of times (frequencies) of memory accesses to each predetermined range in a memory based on the trace information illustrated in FIG. 3. In the following description, it is assumed that the predetermined range is 32 (bytes).

The correlation information illustrated in FIG. 4 includes, as its items, a "number" for identifying respective items of information included in the correlation information, an "address" Indicating the range of addresses in which data subjected to memory access is stored, and an "access frequency" Indicating the number of time of memory accesses.

Specifically, for example, the information processing device 10 specifies information on memory accesses to the data stored in an area of 32 (bytes), of which the "address" starts from "0x00000000" among the items of information included in the trace information illustrated in FIG. 3. That is, the information processing device 10 specifies items of information of which the "addresses" are "0x00000010" and "0x00000018" as information on memory accesses to the data stored in the area of 32 (bytes), of which the "address" starts from "0x00000000". Moreover, as illustrated in FIG. 4, the information processing device 10 sets "0x00000000" to the "address" of the information of which the "number" is "2" and sets "2" to the "access frequency" of the information of which the "number" is "2", for example.

After that, the information processing device 10 preferentially deploys the data stored in an area of which the access frequency is high in a memory (the second memory 2 in the example illustrated in FIG. 2) of which the response period is short by referring to the correlation information illustrated in FIG. 4. In this way, the information processing device 10 can perform data deployment for improving the access efficiency. The description of the other information in FIG. 4 will be omitted.

Here, for example, even when a memory controller that controls memory accesses performs memory accesses by putting a plurality of memory access requests together, such trace information as illustrated in FIG. 3 may be output as if memory accesses are performed without putting the memory access requests together. Thus, in this case, the size of the actual data subjected to memory access is not reflected on the determination of data deployment. Therefore, in this case, the information processing device 10 may be unable to improve the memory access efficiency.

Therefore, the information processing device 10 of the present embodiment calculates a time reduction when items of data stored in the first memory 1 is stored in the second memory 2 based on the address of the data subjected to memory access among the items of data stored in the first memory 1 and the memory access frequency. Moreover, the information processing device 10 preferentially stores data of which the time reduction is large in the second memory 2.

In this way, the information processing device 10 can determine data to be stored in the second memory 2 by referring to the address of the data subjected to memory access as well as the memory access frequency of each data. Due to this, for example, even when a memory controller performs memory accesses by putting a plurality of memory access requests together, it is possible to perform data deployment for improving access efficiency in such a manner that information on the memory accesses executed actually is reflected.

Hereinafter, a case in which the information processing device 10 includes the first memory 1 and the second memory 2 will be described. However, the information processing device 10 may determine data deployment with respect to a plurality of memories included in different physical machines.

[Hardware Configuration of Information Processing Device]

Figure 5:
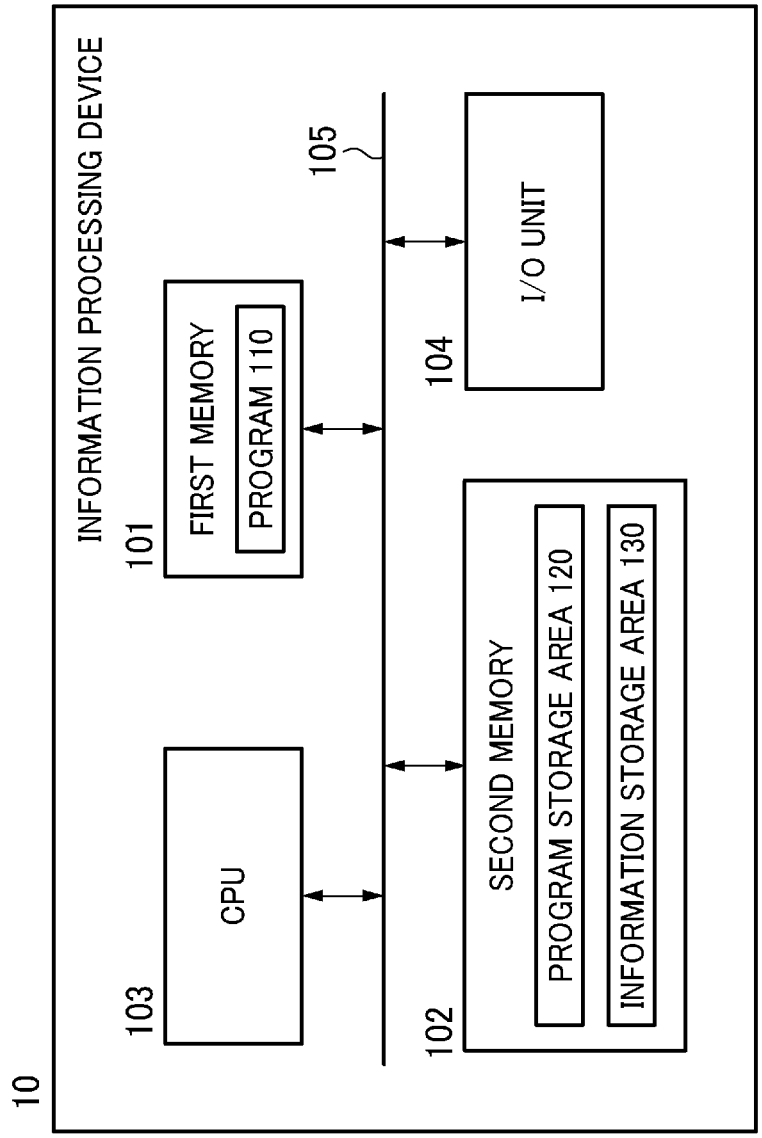
FIG. 5 is a diagram illustrating a hardware configuration of the information processing device 10.

Next, a hardware configuration of the information processing device 10 will be described. FIG. 5 is a diagram illustrating a hardware configuration of the information processing device 10. The information processing device 10 includes a CPU 103 which is a processor, a first memory 101 (hereinafter also referred to as a low-speed memory 101) and a second memory 102 (hereinafter also referred to as a high-speed memory 102) which is a memory having a larger bandwidth than the first memory 101. Moreover, the information processing device 10 includes an external interface (I/O unit) 104 for accessing external apparatuses. The respective units are connected by a bus 105. The CPU 103, the first memory 101, and the second memory 102 may correspond to the CPU 3, the first memory 1, and the second memory 2 described in FIG. 1, respectively.

The second memory 102 illustrated in FIG. 5 stores a program 110 (hereinafter also referred to as a data deployment determination program) for executing a process (hereinafter also referred to as a data deployment determination process) of determining data deployment in a program storage area 120 in the second memory 102. As illustrated in FIG. 5, the CPU 103 loads the program 110 from the second memory 102 into the first memory 101 during execution of the program 110 and performs a data deployment determination process in cooperation with the program 110. Moreover, the second memory 102 includes an information storage area 130 (hereinafter also referred to as a storage unit 130) that stores information used when the data deployment determination process is performed, for example.

The program storage area 120 and the information storage area 130 may be stored in a storage area (including the first memory 101) other than the second memory 102.

[Function of Information Processing Device]

Figure 6:
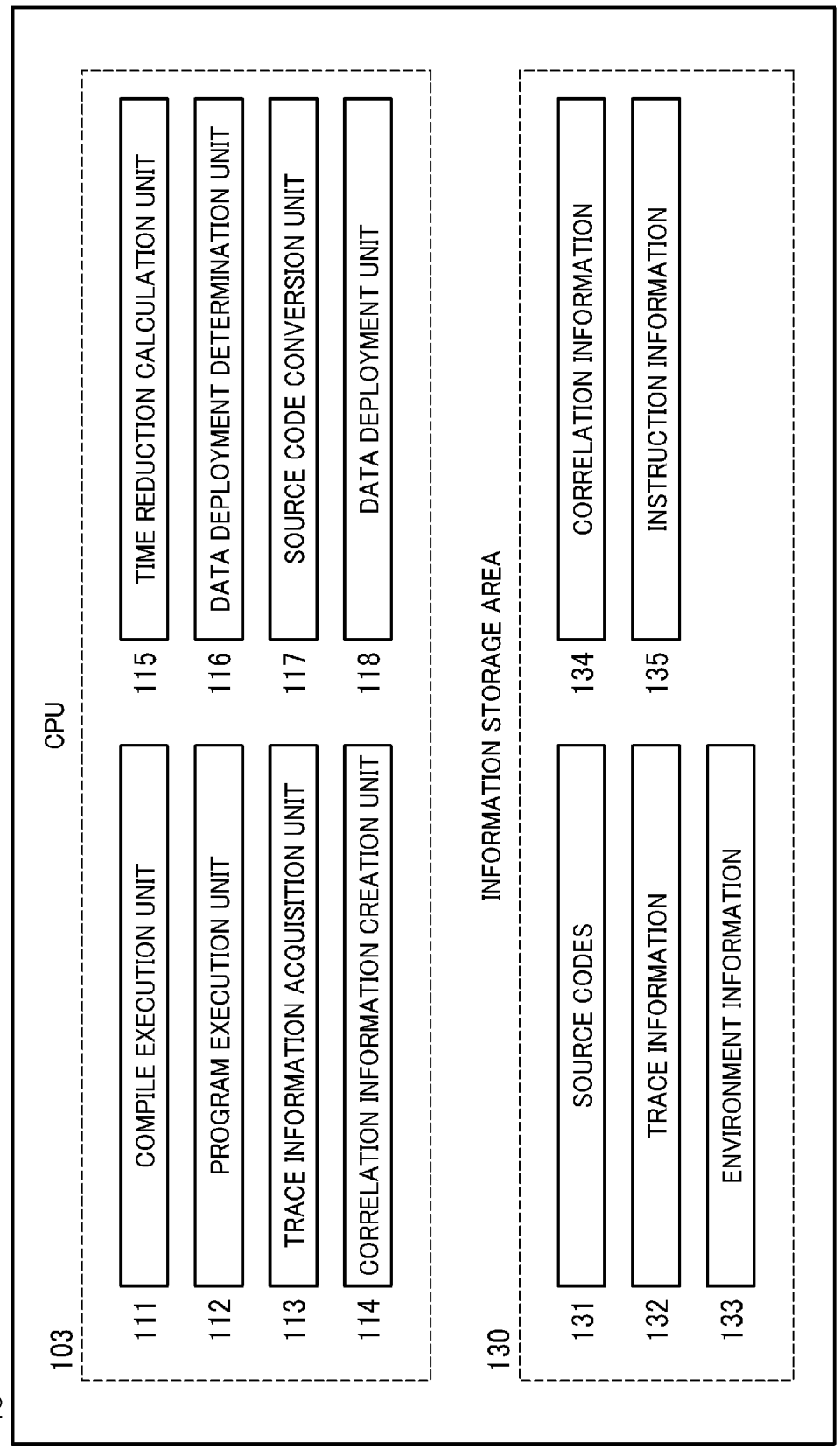
FIG. 6 is a functional block diagram of the information processing device illustrated in FIG. 5.

FIG. 6 is a functional block diagram of the information processing device illustrated in FIG. 5. The CPU 103 of the information processing device 10 functions as a compile execution unit 111, a program execution unit 112, a trace information acquisition unit 113, and a correlation information creation unit 114 by cooperating with the program 110. Moreover, the CPU 103 of the information processing device 10 functions as a time reduction calculation unit 115, a data deployment determination unit 116, a source code conversion unit 117, and a data deployment unit 118 by cooperating with the program 110. Further, source codes 131, trace information 132, environment information 133, correlation information 134, and instruction information 135 are stored in the information storage area 130 of the information processing device 10.

The compile execution unit 111 acquires source codes designated by a source code developer or the like (hereinafter also referred to simply as a developer), for example, among the source codes 131 stored in the information storage area 130. The source codes 131 are source codes created by assuming that a compiled execution program performs memory accesses on the data stored in the first memory 101 only. Moreover, the compile execution unit 111 compiles the source codes acquired from the information storage area 130 and creates an execution program that can be executed by the program execution unit 112 (the CPU 103).

The program execution unit 112 executes the execution program created by the compile execution unit 111 when instructed by a developer, for example.

The trace information acquisition unit 113 acquires the trace information 132 when a predetermined operation is performed during execution of the execution program by the program execution unit 112. Specifically, the trace information acquisition unit 113 acquires the trace information 132 whenever a memory access is performed on the data stored in the first memory 101, for example. Moreover, the trace information acquisition unit 113 stores the acquired trace information 132 in the information storage area 130. The trace information 132 corresponds to the trace information described in FIG. 3, for example.

The correlation information creation unit 114 acquires the address indicating an area in which the data subjected to the memory access by the program execution unit 112 is stored and the frequency information of memory accesses to each address from the trace information 132 stored in the information storage area 130. Moreover, the correlation information creation unit 114 creates the correlation information 134 by correlating the acquired address and the frequency information with each other and stores the correlation information 134 in the information storage area 130.

The correlation information creation unit 114 may acquire the size of the data subjected to memory access in addition to the address and frequency information and create the correlation information 134 by correlating the address, the frequency information, and the size with each other. Moreover, the correlation information creation unit 114 may summarize the frequency information for each address of a predetermined range (for example, 32 (bytes)). A specific example of the correlation information 134 of the present embodiment will be described later.

The time reduction calculation unit 115 calculates, for each address, a time reduction in memory accesses when the data stored in the first memory 101 is stored in the second memory 102 having a larger bandwidth than the first memory 101 based on the correlation information 134 created by the correlation information creation unit 114. Specifically, the time reduction calculation unit 115 calculates a time reduction in memory accesses to each address based on the environment information 133 which is various items of Information for calculating the speed or the like of the memory accesses to the first and second memories 101 and 102 stored in advance in the information storage area 130.

The time reduction calculation unit 115 may summarize the time reduction in memory accesses for each address of a predetermined range (for example, 32 (bytes)). A specific example of calculation of the time reduction in memory accesses will be described later. Moreover, a specific example of the environment information 133 will be described later.

The data deployment determination unit 116 determines data that is to be stored in the second memory 102. Specifically, the data deployment determination unit 116 determines that data of which the time reduction in memory accesses to each address, calculated by the time reduction calculation unit 115 is large is the data that is to be preferentially stored in the second memory 102. Moreover, the data deployment determination unit 116 determines that data that is not able to be stored in the second memory 102 is to be stored in the first memory 101. In this way, the data deployment determination unit 116 can determine data deployment for improving the access efficiency.

Moreover, the data deployment determination unit 116 creates information for creating the source codes corresponding to a case in which the determined data deployment is performed as the instruction information 135. A specific example of how the data to be moved to the second memory 102 is determined will be described later. Moreover, a specific example of the instruction information 135 will be described later.

The source code conversion unit 117 creates the source codes corresponding to a case in which the data deployment determined by the data deployment determination unit 116 is performed based on the instruction information 135. Specifically, the source code conversion unit 117 may create the source codes corresponding to the case in which the data deployment determined by the data deployment determination unit 116 is performed by converting the source codes stored in the information storage area 130.

The data deployment unit 118 stores data in the first and second memories 101 and 102 based on the data deployment determined by the data deployment determination unit 116. In this way, the data deployment unit 118 can realize consistency between the content of the source codes created (converted) by the source code conversion unit 117 and the memories in which the items of data are actually stored.

First Embodiment

Figure 7:
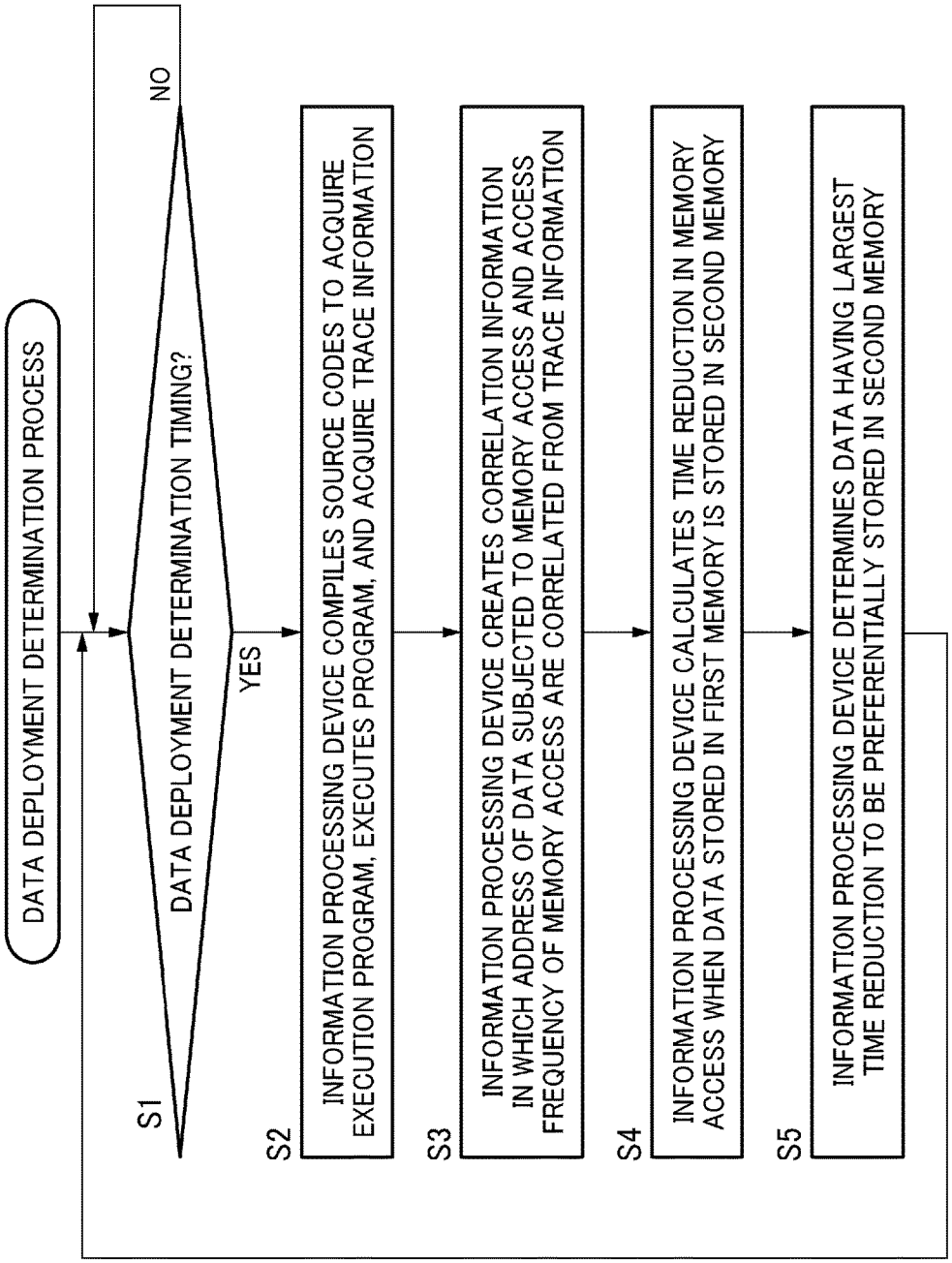
FIG. 7 is a flowchart for describing an outline of a data deployment determination process according to the first embodiment.

Next, a first embodiment will be described. FIG. 7 is a flowchart for describing an outline of a data deployment determination process according to the first embodiment.

First, the information processing device 10 waits until a data deployment determination timing (S1: NO). The data deployment determination timing may be the time at which an instruction is issued by a developer, for example. Specifically, the data deployment determination timing occurs after a developer created source codes and before a program that has compiled the source codes is actually operated, for example.

Subsequently, when the data deployment determination timing arrives (S1: YES), the information processing device 10 compiles the source codes of which the data deployment needs to be determined among the source codes stored in the information storage area 130 to create an execution program (S2). The source codes that are to be compiled may be determined based on information input by a developer, for example.

Subsequently, the information processing device 10 executes the created execution program to acquire the trace information 132 (S2). The trace information 132 may be acquired by the information processing device 10 when a memory access to the data stored in the first memory 101 occurs during execution of the execution program, for example. The execution program may include a process of automatically outputting the trace information 132 according to execution of memory accesses.

After that, the information processing device 10 creates the correlation information 134 that correlates the address and the frequency information of memory accesses with each other from the trace information 132 stored in the information storage area 130 (S3). A specific example of the correlation information 134 will be described later.

The information processing device 10 calculates a time reduction in memory accesses to each address when the data stored in the first memory 101 is stored in the second memory 102 (S4).

That is, the information processing device 10 of the present embodiment acquires the addresses of the items of data subjected to memory accesses as well as the frequency information of memory accesses to the items of data when determining a memory in which each data has to be stored. In this way, the information processing device 10 can acquire the Information (the size or the like of memory access target data) on the memory accesses performed actually by performing calculation based on the frequency information and the addresses of memory accesses when memory accesses are performed by putting memory access requests together.

Moreover, the information processing device 10 of the present embodiment calculates a time reduction in memory accesses when the data stored in the first memory 101 is stored in the second memory 102 based on the acquired items of information. In this way, the information processing device 10 can determine the priority in determining whether items of data are to be stored in the second memory 102 by taking the information on memory accesses performed actually into consideration.

Moreover, the information processing device 10 determines that the data of which the time reduction calculated in S4 is largest is the data that is to be preferentially stored in the second memory 102 (S5). That is, the information processing device 10 stores data in the second memory 102 in descending order of the time reduction calculated in S4 as long as data can be stored in the second memory 102.

As described above, according to the first embodiment, the information processing device 10 acquires the addresses indicating an area in which the data subjected to memory accesses is stored from the trace information 132 of the first memory 101 obtained by executing a program executed by compiling the source codes. Further, the information processing device 10 acquires the frequency information of each address. Moreover, the information processing device 10 creates the correlation information 134 that correlates the acquired addresses and the frequency information with each other.

Subsequently, the information processing device 10 calculates, for each address, the time reduction of memory accesses when the data stored in the first memory 101 is stored in the second memory 102 which is a memory faster than the first memory 101 based on the created correlation information 134. Moreover, the information processing device 10 determines that the data stored in an address of which the time reduction is large is the data that is to be preferentially stored in the second memory 102.

In this way, the information processing device 10 can determine a memory in which respective items of data are to be stored based on the information on memory accesses performed actually.

Details of First Embodiment

Next, the details of the first embodiment will be described. FIGS. 8 to 12 are flowcharts for describing the details of the data deployment determination process according to the first embodiment. Moreover, FIGS. 13 to 20 are diagrams for describing the details of the data deployment determination process according to the first embodiment.

The details of the data deployment determination process illustrated in FIGS. 8 to 12 will be described with reference to FIGS. 3, 7, and 13 to 20.

According to the details of the first embodiment, the information processing device 10 determines whether information indicating successive memory accesses (hereinafter also referred to as successive access) being performed on a plurality of items of data stored in successive addresses is included in the trace information 132. When the information (hereinafter also referred to as successive access information) indicating the successive access is included in the trace information 132, the information processing device 10 creates the correlation information 134 by assuming that memory accesses to the entire successive addresses have been performed collectively. Further, the information processing device 10 calculates the time reduction in memory accesses for each address subjected to successive accesses.

[Details of Processes of S1 and S2]

First, the details of the processes of processes S1 and S2 described in FIG. 7 will be described.

Figure 8:
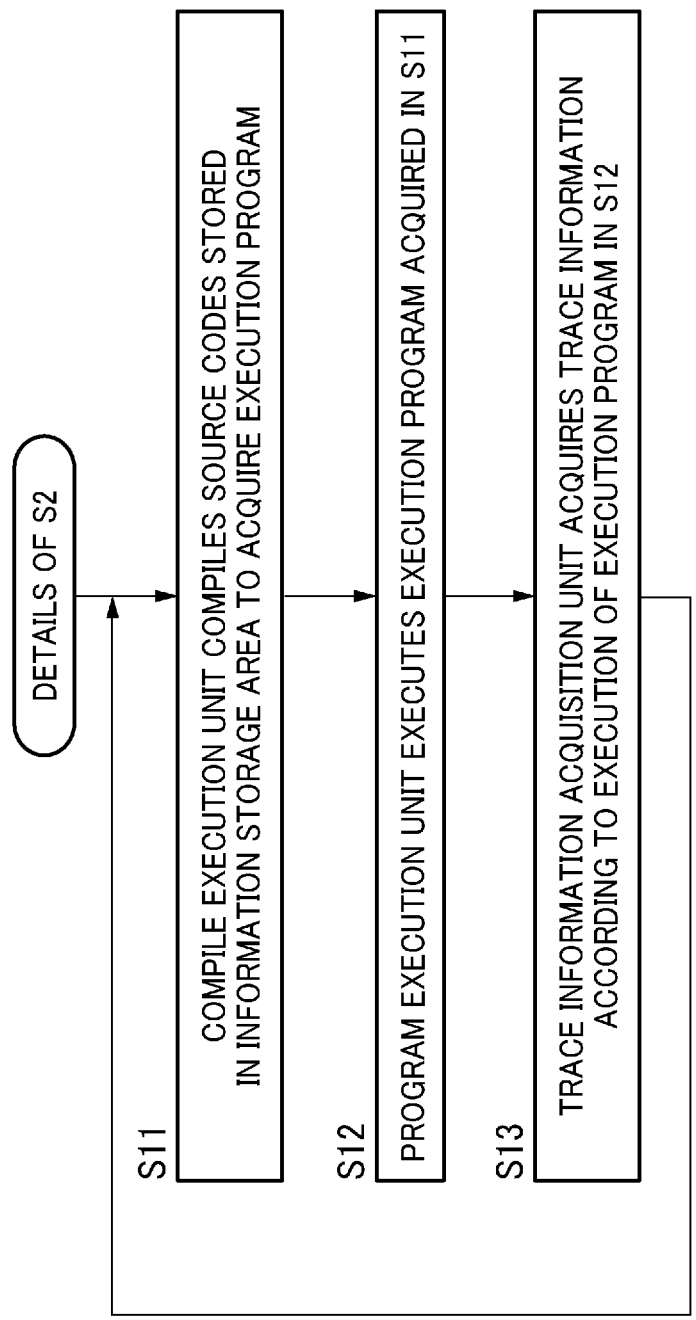
FIG. 8 is a flowchart for describing the details of the data deployment determination process according to the first embodiment.

The compile execution unit 111 of the information processing device 10 waits until the data deployment determination timing (S1 in FIG. 7: NO). When the data deployment determination timing occurs (S1 in FIG. 7: YES), the compile execution unit 111 of the information processing device 10 acquires source codes for determining data deployment from the information storage area 130 as illustrated in FIG. 8 (S11). After that, the compile execution unit 111 compiles the acquired source codes to acquire an execution program (S11).

After that, the program execution unit 112 of the information processing device 10 executes the execution program acquired in S11 (S12). Moreover, the trace information acquisition unit 113 of the information processing device 10 acquires the trace information 132 according to execution of the execution program in S12 (S13).

In processes S12 and S13, a developer may prepare a test environment for allowing the program execution unit 112 to execute an execution program, for example. In this way, the developer can acquire the trace information 132 before releasing the execution program to a real environment (an environment for operating the execution program in order to provide services to users). That is, the developer can execute the data deployment determination process without any influence on the real environment.

[Details of Process of S3] Next, the details of the process of S3 described in FIG. 7 will be described.

Figure 9:
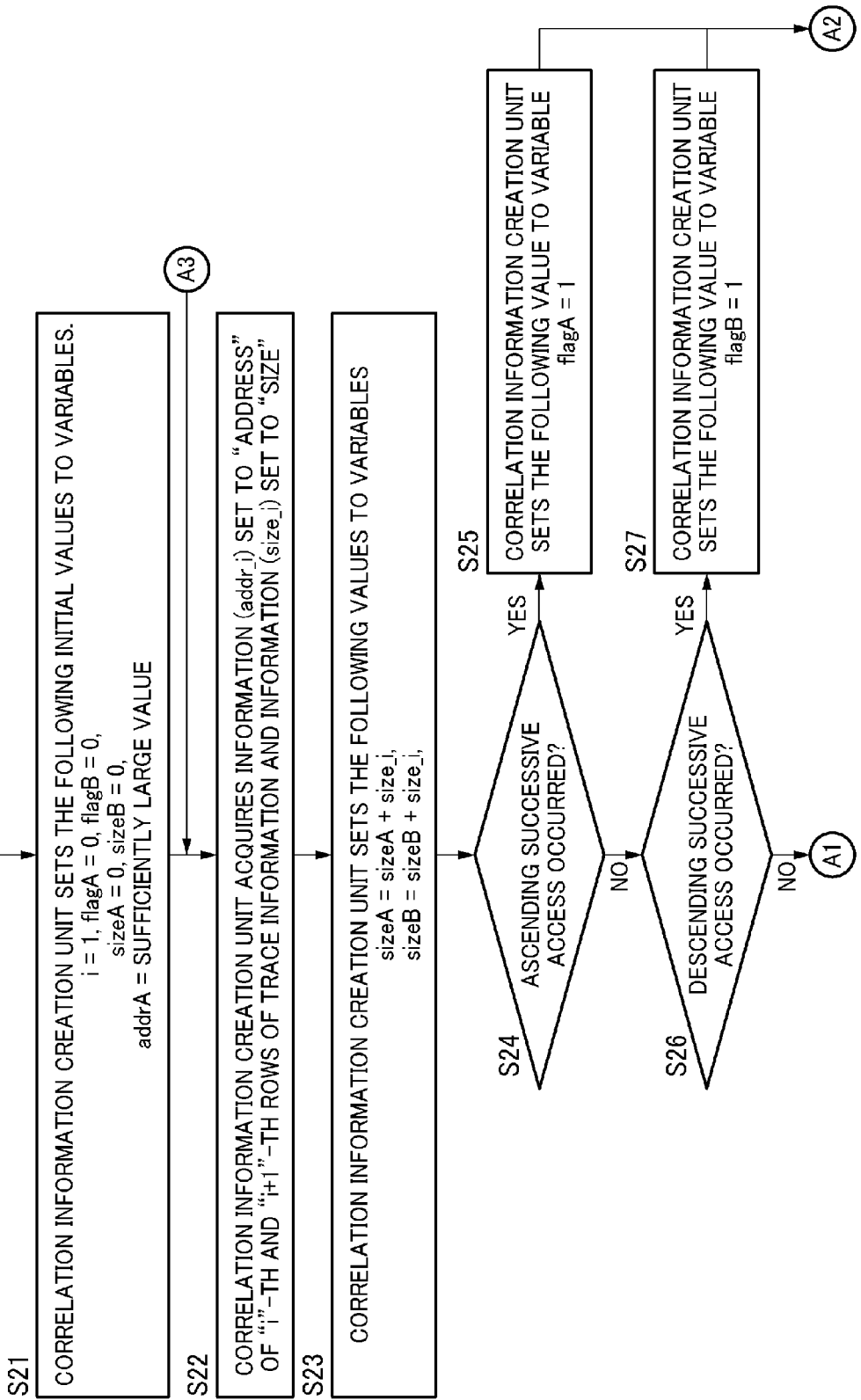
FIG. 9 is a flowchart for describing the details of the data deployment determination process according to the first embodiment.

As illustrated in FIG. 9, the correlation information creation unit 114 of the information processing device 10 sets initial values to respective variables (S21). Specifically, the correlation information creation unit 114 sets "1" to "i" Indicating the row of the trace information 132. Moreover, the correlation information creation unit 114 sets "0" indicating that successive accesses are not occurring to "flagA" Indicating that successive accesses are occurring in an increasing order of addresses, and "flagB" indicating that successive accesses are occurring in a decreasing order of addresses. Moreover, the correlation information creation unit 114 sets "0" to "sizeA" which is a total size of the data subjected to memory accesses. Moreover, the correlation information creation unit 114 sets "0" to "sizeB" which is a total size of the data subjected to memory accesses during a period in which successive accesses occur. Further, the correlation information creation unit 114 sets a value (hereinafter also referred to simply as a sufficiently large value)

larger than a value that is likely to be set to the "address" of the trace information 132 to "addrA" in which the address of access target data is stored.

(Process when "i" is "1")

Subsequently, the correlation information creation unit 114 acquires information (hereinafter also referred to as "addr_i") set to the "address" of the "i"-th row of the trace information 132 and information (hereinafter also referred to as "size_i") set to the "size" of the "i"-th row of the trace information 132 (S22). Moreover, the correlation information creation unit 114 acquires information (hereinafter also referred to as "addr_i+1") set to the "address" of the "i+1"-th row of the trace information 132 and information (hereinafter also referred to as "size_i+1") set to the "size" of the "i+1"-th row (S22). Here, "i" included in "addr_i", "size_i", "addr_i+1" and "size_i+1" corresponds to "i" which is the variable described in S21.

Specifically, the correlation information creation unit 114 acquires "0x00001000" (4096 In a decimal notation) which is the information set to the "address" corresponding to a row of which the "number" is "1" as the "addr_1" in the trace information 132 illustrated in FIG. 3, for example. Moreover, the correlation information creation unit 114 acquires "8" which is the Information set to the "size" corresponding to a row of which the "number" is "1" as the "size_1". Similarly, the correlation information creation unit 114 acquires "0x00000010" (16 in a decimal notation) which is the information set to the "address" corresponding to a row of which the "number" is "2" as the "addr_2". Moreover, the correlation information creation unit 114 acquires "8" which is the information set to the "size" corresponding to a row of which the "number" is "2" as the "size_2".

Moreover, the correlation information creation unit 114 performs to add the values set to the "size_i" to the values set to the "sizeA" and "sizeB", respectively (S23).

Specifically, the correlation information creation unit 114 adds "8" which is the value of "size_1" to "0" which is the value of "sizeA" in the example of the trace information 132 illustrated in FIG. 3 and sets "8" as a new value of "sizeA". Similarly, the correlation information creation unit 114 adds "8" which is the value of "size_1" to "0" which is the value of "sizeB" and sets "8" to a new value of "size".

Subsequently, the correlation information creation unit 114 determines whether a memory access corresponding to the information acquired from the trace information 132 is a memory access included in a successive access (hereinafter also referred to as an ascending successive access) in an increasing direction (ascending order) of addresses (S24).

Specifically, the correlation information creation unit 114 may determine that an ascending successive access has occurred when the value obtained by adding the value of "size_i" to the value of "addr_i" is the same as the value of "addr_i+1", for example. That is, in this case, the correlation information creation unit 114 can determine that data corresponding to the information on the "i"-th row of the trace information 132 and the data corresponding to the information on the "i+1"-th row are stored in a successive area.

Further, the correlation information creation unit 114 may determine an ascending successive access has occurred when "flagB" is "0". That is, in this case, the correlation information creation unit 114 can determine that the memory access corresponding to the information on the "i"-th row is not a memory access included in a successive access (hereinafter also referred to a descending successive access) in a decreasing direction (descending order) of addresses.

When it is determined that an ascending successive access has occurred (S24: YES), the correlation information creation unit 114 sets "1" indicating the occurrence of an ascending successive access to "flagA" (S25).

On the other hand, when it is determined that an ascending successive access has not occurred (S24: NO), the correlation information creation unit 114 determines whether a memory access corresponding to the information acquired from the trace information 132 is included in a descending successive access (S26).

Specifically, the correlation information creation unit 114 may determine that a descending successive access has occurred when a value obtained by subtracting the value of "size_i" from the value of "addr_i" is the same as the value of "addr_i+1" for example. Further, the correlation information creation unit 114 may determine that a descending successive access has occurred when "flagA" is "0", for example.

Moreover, when it is determined that a descending successive access has occurred (S26: YES), the correlation information creation unit 114 sets "1" indicating the occurrence of a descending successive access to "flagB" (S27).

In the example of the trace information illustrated in FIG. 3, the value obtained by adding "8" which is the value of "size_1" to "4096" which is a decimal notation of the value of "addr_1" is "4104". Moreover, a value obtained by subtracting "8" which is the value of "size_1" from "4096" which is a decimal notation of the value of "addr_1" is "4088". Thus, any of the values are not the same as "16" which is a decimal notation of the value of "addr_2". Thus, in this case, the correlation information creation unit 114 determines that the memory access corresponding to the information acquired from the trace information 132 in S522 is not a memory access included in an ascending or descending successive access (S24: NO, S26: NO).

Figure 10:
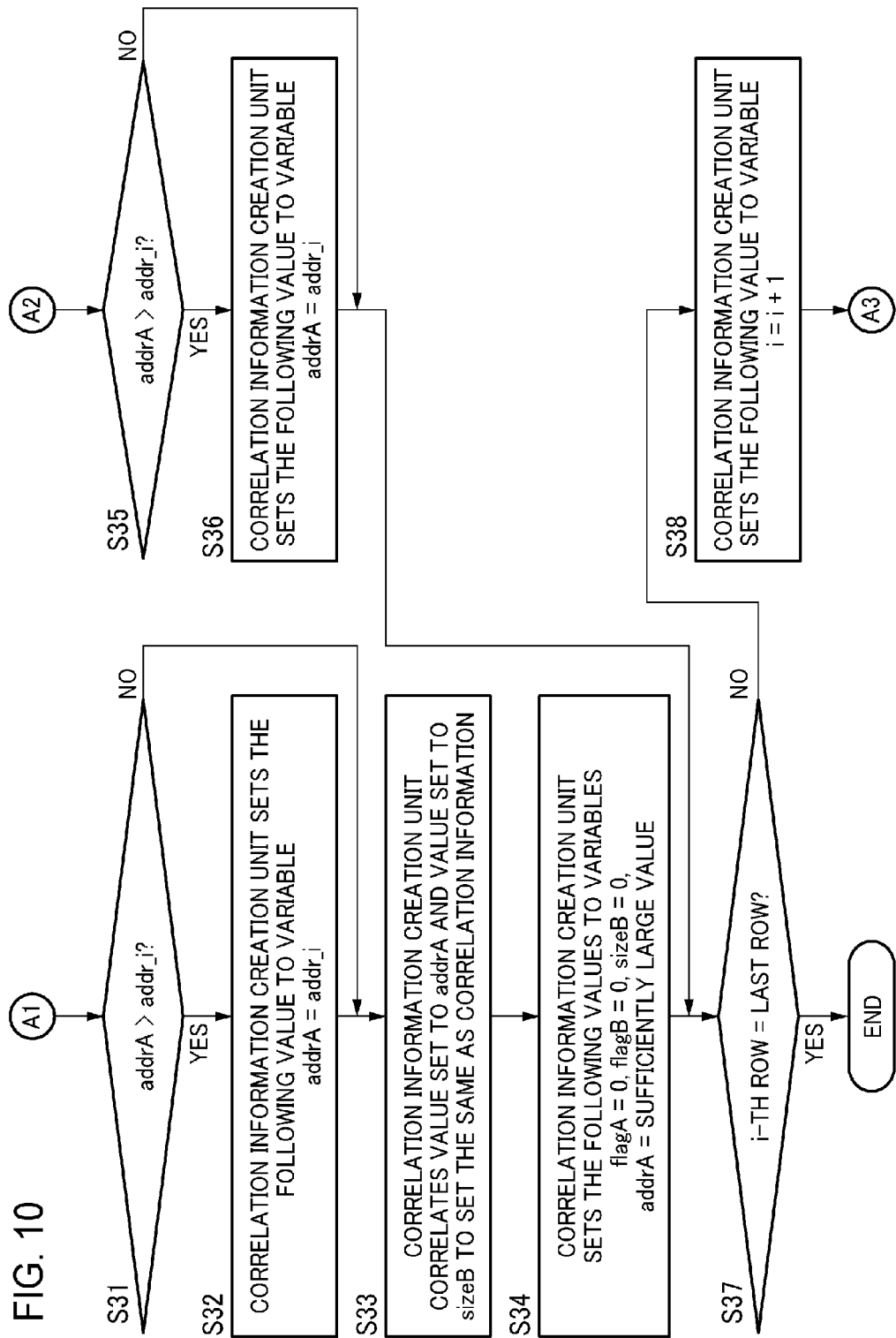
FIG. 10 is a flowchart for describing the details of the data deployment determination process according to the first embodiment.

Subsequently, as illustrated in FIG. 10, the correlation information creation unit 114 compares the value set to "addrA" and the value set to "addr_i" (S31 or S35). Moreover, when the value set to "addrA" is larger than the value set to "addr_i" (S31: YES or S35: YES), the correlation information creation unit 114 sets the value set to "addr_i" to "addrA" (S32 or S36). On the other hand, when the value set to "addrA" is smaller than the value set to "addr_i" (S31: NO or S35: NO), the correlation information creation unit 114 does not set a new value to "addrA".

That is, although the details will be described later, when an ascending or descending successive access occurs (S24: YES or S26: YES), the value set to "addrA" is not initialized in S34. Thus, the correlation information creation unit 114 sets the starting address among the addresses subjected to memory accesses in the ascending or descending successive access to "addrA" (S35: YES, S36).

When a memory access that is not included in the successive access has occurred (S24: NO, S26: NO), a sufficiently large value is set to "addrA" (S21, S34). Thus, in this case, the correlation information creation unit 114 sets the value set to "addr_i" to "addrA" (S31: YES, S32).

Specifically, when information set to the "address" of the 1-st row of the trace information 132 illustrated in FIG. 3 is acquired in S22, a sufficiently large value is set to "addrA" (S31: YES). Thus, the correlation information creation unit 114 sets "0x00001000" which is the value set to "addr_1" to "addrA" (S32).

After the process S31 or S32 is performed, the correlation information creation unit 114 correlates the values set to "addrA" and "sizeB" and sets the same as the correlation information 134 (S33).

FIG. 13 is a specific example of the correlation information 134 after the process of S33 when the value set to "i" is "1". The correlation information 134 illustrated in FIG. 13 includes, as its items, a "size" indicating the size of the data subjected to memory accesses in addition to the items included in the correlation information described in FIG. 4.

Specifically, in the example of the trace information 132 illustrated in FIG. 3, the correlation information creation unit 114 sets "0x00001000" which is the value of "addr_1" to the "address" as illustrated in FIG. 13. Similarly, the correlation information creation unit 114 sets "8" which is the value of "sizeB" to the "size" Moreover, the correlation information creation unit 114 sets "1" indicating the memory access to an area including "0x00001000" being executed once to the "access frequency".

After that, the correlation information creation unit 114 updates the values of respective variables (S34). Specifically, the correlation information creation unit 114 sets "0" to "flagA" and "flagB" similarly to the case of S21. Moreover, the correlation information creation unit 114 sets "0" to "sizeB". Moreover, the correlation information creation unit 114 sets a sufficiently large value to "addrA" That is, the correlation information creation unit 114 initializes the respective variables when the information acquired from the trace information 132 is reflected on the correlation information 134.

After the process of S34, S35 or S36 is performed, the correlation information creation unit 114 determines whether the "i"-th row of the trace information 132 is the last row (S37). When it is determined that the "i"-th row is not the last row (S37: NO), the correlation information creation unit 114 adds "1" to the value set to "i" (S38). On the other hand, when it is determined that the "i"-th row is the last row (S37: YES), the correlation information creation unit 114 executes the processes subsequent to S22 again.

Specifically, in the example illustrated in FIG. 3, since the 1-st row is not the last row (11-th row) (S37: NO), the correlation information creation unit 114 sets "2" obtained by adding "1" to "1" which is the value set to "i" as a new "i" (S38).

(Process when "i" is "2")

Returning to FIG. 9, the correlation information creation unit 114 acquires "0x00000010" which is the value set to the "address" of the second row of the trace information 132 as "addr_2" (S22). Moreover, the correlation information creation unit 114 acquires "8" which is the value set to the "size" of the second row of the trace information 132 as "size_2" (S22). Similarly, the correlation information creation unit 114 acquires "0x00000018" (24 in a decimal notation) which is the value set to the "address" of the third row of the trace information 132 as "addr_3" (S22). Moreover, the correlation information creation unit 114 acquires "8" which is the value set to the "size" of the third row of the trace information 132 as "size_3" (S22).

Moreover, the correlation information creation unit 114 sets "16" obtained by adding "8" which is the value of "size_2" to "8" which is the value set to "sizeA" as a new value of "sizeA" (S23). Similarly, the correlation information creation unit 114 sets "8" obtained by adding "8" which is the value of "size_2" to "0" which is the value set to "sizeB" as a new value of "sizeB" (S23).

Subsequently, the correlation information creation unit 114 determines whether a memory access corresponding to the information acquired from the trace information 132 is included in a successive access (S24, S26). Specifically, "24" which is a value obtained by adding "8" which s the value of "size_2" to "16" which is a decimal notation of the value of "addr_2" is the same as "24" which is a decimal notation of the value of "addr_3". Thus, the correlation information creation unit 114 determines that the memory access corresponding to the information acquired from the trace information 132 is a memory access included in an ascending successive access (S24: YES). Thus, the correlation information creation unit 114 sets the value of "flagA" to "1" (S25).

Moreover, since a sufficiently large value is set to "addrA" (S35: YES), the correlation information creation unit 114 sets "0x00000010" which is the value of "addr_2" to "addrA" (S36). After that, since the second row of the trace information 132 is not the last row (S37: NO), the correlation information creation unit 114 updates the value of "i" to "3" (S38).

That is, when the value of "i" is "2", the correlation information creation unit 114 does not perform the process of S33. Thus, in this case, the correlation information creation unit 114 does not set information to the correlation information 134.

(Process when "i" is "3")

Returning to FIG. 9, the correlation information creation unit 114 acquires "0x00000018" which is the value set to the "address" of the third row of the trace information 132 as "addr_3" (S22). Moreover, the correlation information creation unit 114 acquires "8" which is the value set to the "size" of the third row of the trace information 132 as "size_3" (S22). Similarly, the correlation information creation unit 114 acquires "0x00000020" (32 in a decimal notation) which is the value set to the "address" of the fourth row of the trace information 132 as "addr_4" (S22). Moreover, the correlation information creation unit 114 acquires "8" which is the value set to the "size" of the fourth row of the trace information 132 as "size_4" (S22).

Subsequently, the correlation information creation unit 114 sets "24" obtained by adding "8" which is the value of "size_3" to "16" which is the value set to "sizeA" as a new value of "sizeA" (S23). Similarly, the correlation information creation unit 114 sets "16" obtained by adding "8" which is the value of "size_3" to "8" which is the value set to "sizeB" as a new value of "sizeB" (S23).

That is, when it is determined in the process of S24 or S26 that an ascending or descending successive access has occurred, the correlation information creation unit 114 does not initialize the variables such as "sizeB" and "addrA" (S24: YES, S26: YES). Thus, a total size of the items of data subjected to memory accesses during a period in which successive accesses occur is set to "sizeB". Moreover, the starting address of the addresses subjected to memory accesses in a period in which successive accesses occur is set to "addrA".

Moreover, "32" which is a value obtained by adding "8" which is the value of "size_3" to "24" which is a decimal notation of the value of "addr_3" is the same as "32" which is a decimal notation of the value of "addr_4". Thus, the correlation information creation unit 114 determines that the memory access corresponding to the information acquired from the trace information 132 is a memory access included in ascending successive accesses (S24: YES). Thus, the correlation information creation unit 114 maintains "1" as the value of "flagA" (S25).

Subsequently, "0x00000010" which is the value of "addr_2" is set to "addrA". Thus, "0x00000010" which is the value of "addrA" is smaller than "0x00000018" which is the value of "addr_3" (S35: NO). Thus, the correlation information creation unit 114 does not set the value of "addrA".

Moreover, since the third row of the trace information 132 is not the last row (S37: NO), the correlation information creation unit 114 updates the value of "i" to "4" (S38).

Since the process of the correlation information creation unit 114 when the value of "i" is "4" is the same as the process of the correlation information creation unit 114 when "i" is "3", the description thereof will be omitted.

(Process when "i" is "5")

When the value of "i" is updated to "5" (S38), the correlation information creation unit 114 acquires "0x00000028" (40 in a decimal notation) which is the value set to the "address" of the fifth row of the trace information 132 as "addr_5" (S22). Moreover, the correlation information creation unit 114 acquires "8" which is the value set to the "size" of the fifth row of the trace information 132 as "size_5" (S22). Further, the correlation information creation unit 114 acquires "0x00000078" (120 in a decimal notation) which is the value set to the "address" of the sixth row of the trace information 132 as "addr_6" (S22). Moreover, the correlation information creation unit 114 acquires "8" which is the value set to the "size" of the sixth row of the trace information 132 as "size_6" (S22).

Moreover, the correlation information creation unit 114 sets "40" obtained by adding "8" which is the value of "size_5" to "32" which is the value set to "sizeA" as a new value of "sizeA" (S23). Similarly, the correlation information creation unit 114 sets "32" obtained by adding "8" which is the value of "size_S" to "24" which is the value set to "sizeB" as a new value of "sizeB" (S23).

Here, "48" which is a value obtained by adding "8" which is the value of "size_5" to "40" which is the value of "addr_5" is not the same as "120" which is a decimal notation of the value of "addr_5". Moreover, "32" which is a value obtained by subtracting "8" which is the value of "size_5" from "40" which is the value of "addr_5" is not the same as "120" which is a decimal notation of the value of "addr_5". Thus, the correlation information creation unit 114 determines that a memory access corresponding to the information acquired from the trace information 132 is not a memory access included in the successive access (S24: NO, S26: NO).

Subsequently, "0x00000010" which is the value of "addr_2" is set to "addrA". Thus, "0x00000010" which is the value of "addrA" is smaller than "0x00000028" which is the value of "addr_5" (S35: NO). Thus, the correlation information creation unit 114 maintains the value set to "addrA".

Moreover, the correlation information creation unit 114 correlates the values set to "addrA" and "sizeB" and sets the same as the correlation information 134 (S33).

FIG. 14 is a specific example of the correlation information 134 after the process of S33 when the value set to "i" is "5". As illustrated in FIG. 14, the correlation information creation unit 114 sets "0x00000010" which is the value of "addrA" to the "address". Similarly, the correlation information creation unit 114 sets "32" which is the value of "sizeB" to the "size". Moreover, the correlation information creation unit 114 sets "1" Indicating the memory access to an area including "0x00000010" being executed once to the "access frequency".

Returning to FIG. 10, the correlation information creation unit 114 updates the values of the respective variables (S34). Specifically, the correlation information creation unit 114 sets "0" to "flagA" and "flagB". Moreover, the correlation information creation unit 114 sets "0" to "sizeB". Further, the correlation information creation unit 114 sets a sufficiently large value to "addrA".

Moreover, since the fifth row of the trace information 132 is not the last row (S37: NO), the correlation information creation unit 114 updates the value of "i" to "6" (S38). Since the subsequent processes of S3 are the same as those described above, the description thereof will be omitted.

FIG. 15 is a specific example of the correlation information 134 on which all items of information included in the trace information 132 illustrated in FIG. 3 are reflected. In the example of the trace information 132 illustrated in FIG. 3, the content of the items of information of which the "number" are "7" and "11" is the same as the content of the information of which the "number" is "1". That is, the trace information 132 illustrated in FIG. 3 indicates that a memory access to an area of "8 (bytes)" of which an address starts from "0x00001000" has occurred three times. Thus, the correlation information creation unit 114 may update the "access frequency" of the row of which the "number" is "1" to "3" as illustrated in FIG. 15 without adding a new row corresponding to the items of information of which the "number" are "7" and "11". The description of the other information of FIG. 15 will be omitted.

[Details of Process of S4]

Next, the details of the process of S4 described in FIG. 7 will be described.

Figure 11:
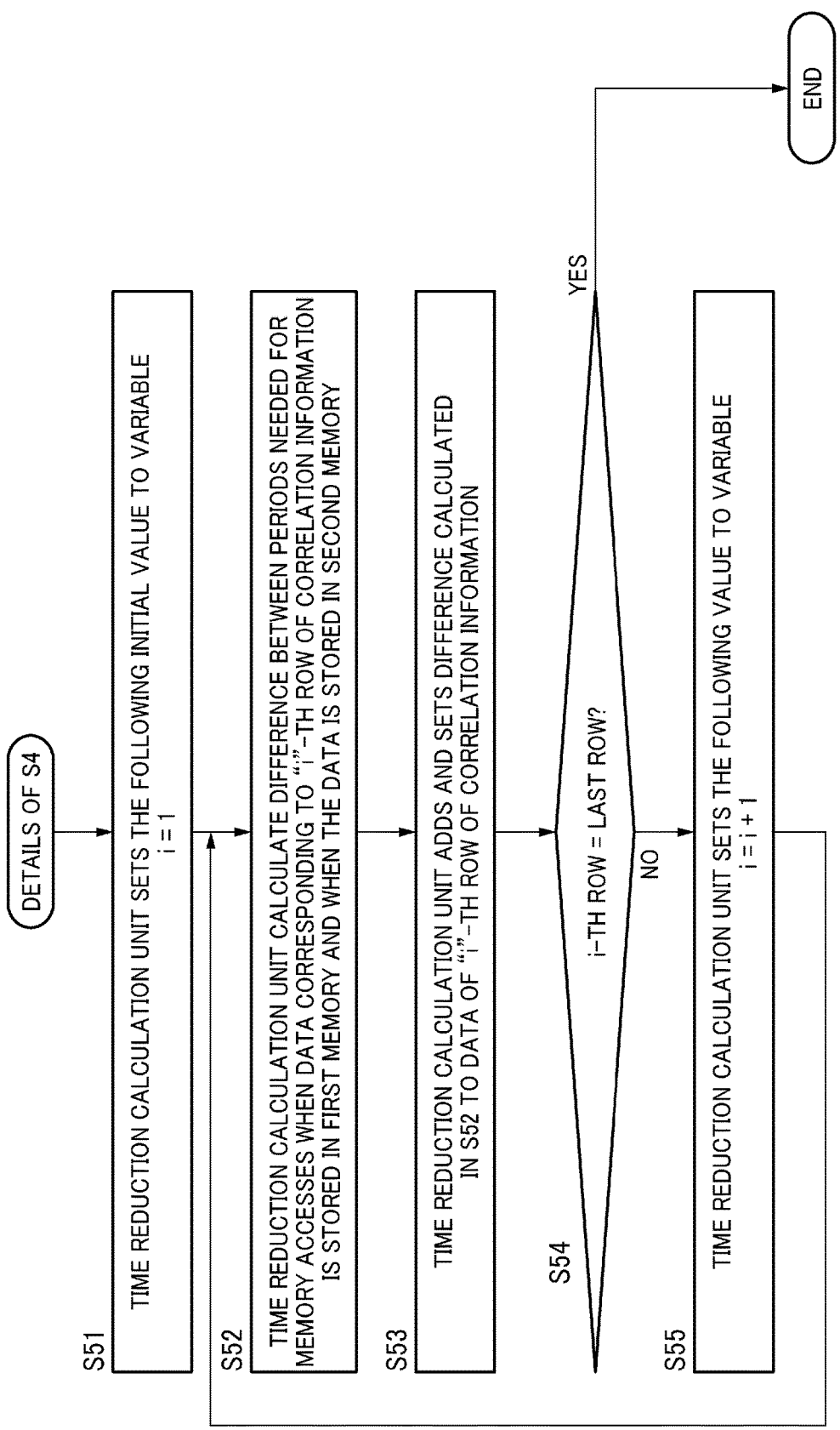
FIG. 11 is a flowchart for describing the details of the data deployment determination process according to the first embodiment.

The time reduction calculation unit 115 of the information processing device 10 sets initial values to respective variables as illustrated in FIG. 11 (S51). Specifically, the time reduction calculation unit 115 sets "1" to "i".

Moreover, the time reduction calculation unit 115 calculates a period needed for a memory access when the data corresponding to the "i"-th row of the correlation information 134 is stored in the first memory 101. Moreover, the time reduction calculation unit 115 calculates a period needed for a memory access when the data corresponding to the "i"-th row of the correlation information 134 is stored in the second memory 102. Moreover, the time reduction calculation unit 115 calculates a difference in the calculated periods needed for the memory accesses (S52).

Specifically, the time reduction calculation unit 115 calculates the periods needed for the memory accesses using Expressions (2) and (3), for example.

$$T1 = \max(0, (x - Linesize)/B1) + L1 \qquad (2)$$

$$T2 = \max(0, (x - Linesize)/B2) + L2 \qquad (3)$$

In Expressions (2) and (3), "x" is the size of memory access target data. Moreover, "B1" is the bandwidth (the size of data that a memory can transmit in unit period) of the first memory 101 and "B2" is the bandwidth of the second memory 102. Moreover, "L1" is the value of a delay period when the CPU 103 communicates with the first memory 101, and "L2" is the value of a delay period when the CPU 103 communicates with the second memory 102. Further, "Linesize" is the size of data that a memory reads each time. Moreover, "T1" is a period needed for the CPU 103 to perform a memory access to the first memory 101, and "T2" is a period needed for the CPU 103 to perform a memory access to the second memory 102.

Moreover, max(0,(x−Linesize)/B1) is a function indicating the larger value among the values of "0" and "(x−Linesize)/B1". Moreover, in the following description, it is assumed that "81" is "4", "L1" is "40", "B2" is "16", "2" is "40", and "Linesize" is "8". Further, the unit of "Linesize" is B (bytes), for example, the unit of "T1", "T2" "L1", and "L2" is msec (milliseconds), for example, and the unit of "B1" and "B2" is B (bytes)/msec (milliseconds), for example.

Hereinafter, a specific example of how the period needed for a memory access is calculated based on the information included in the correlation information 134 of FIG. 15 will be described.

In the correlation information 134 of FIG. 15, the "size" corresponding to the information of which the "number" is "1" is "8". Thus, the time reduction calculation unit 115 calculates "0" which is a value obtained by dividing a value obtained by subtracting "8" which is the value set to "Linesize" from "8" which is the value set to the "size" corresponding to the information of which the "number" is "1" by "4" which is the value of "B1" based on Expression (2). Moreover, since "0" is the same as "0" the time reduction calculation unit 115 calculates "0" as the value of max(0,(x−Linesize)/B1). Further, the time reduction calculation unit 115 calculates "40" obtained by adding "40" which is the value of "L1" to the calculated value "0" as the value of "T1".

Subsequently, the time reduction calculation unit 115 calculates "0" which is a value obtained by dividing a value obtained by subtracting "8" which is the value set to "Linesize" from "8" which is the value set to the "size" corresponding to the information of which the "number" is "1" by "16" which is the value of "B2" based on Expression (3). Moreover, since "0" is the same as "0", the time reduction calculation unit 115 calculates "0" as the value of max(0,(x−Linesize)/B2). Further, the time reduction calculation unit 115 calculates "40" obtained by adding "40" which is the value of "L2" to the calculated value "0" as the value of "T2".

Moreover, the time reduction calculation unit 115 calculates "0" obtained by subtracting "40" which is the value of "T2" from "40" which is the value of "T1" as the time reduction in the memory access when the data corresponding to the information of which the "number" is "1" is moved from the first memory 101 to the second memory 102.

Further, since "3" is set to the "access frequency", the time reduction calculation unit 115 calculates "0" obtained by multiplying the calculated value "0" by "3". In this way, the time reduction calculation unit 115 can calculate "0" as a total time reduction in the memory accesses when the data corresponding to the information of which the "number" is "1" is moved from the first memory 101 to the second memory 102.

Returning to FIG. 11, the time reduction calculation unit 115 sets the total time reduction calculated in S52 to the correlation information 134 (S53).

FIG. 16 is a specific example of the correlation information 134 when the total time reduction calculated in S52 is set. The correlation information 134 illustrated in FIG. 16 includes the item of "time reduction" in which the total time reduction calculated in S52 is set in addition to the items included in the correlation information 134 described in FIG. 15. Specifically, as illustrated in FIG. 16, the time reduction calculation unit 115 sets "0" which is the total time reduction calculated in S52 to the "time reduction" corresponding to the information of which the "address" is "0x40001000" The unit of "time reduction" is msec, for example.

Returning to FIG. 11, the time reduction calculation unit 115 determines whether the "i"-th row is the last row (S54). Moreover, when the "i"-th row is the last row (S54: YES), the time reduction calculation unit 115 ends the process of S4. On the other hand, when the "i"-th row is not the last row (S54: NO), the time reduction calculation unit 115 adds "1" to the value set to "i" (S55) and executes the processes subsequent to S52 again.

Specifically, when the value set to "i" is "1" the "i"-th row is not the last row (the fifth row). Thus, the time reduction calculation unit 115 sets "2" obtained by adding "1" to "1" which is the value of "i" as a new value of "i".

Next, a specific example of the process of S52 when the value set to "i" is "2" will be described.

In the correlation information 134 of FIG. 15, the "size" corresponding to the information of which the "number" is "2" is "32". Thus, the time reduction calculation unit 115 calculates "6" which is a value obtained by dividing a value obtained by subtracting "8" which is the value set to "Linesize" from "32" which is the value set to the "size" corresponding to the Information of which the "number" is "2" by "4" which is the value of "B1" based on Expression (2). Moreover, since "6" is larger than "0", the time reduction calculation unit 115 calculates "6" as the value of max(0,(x−Linesize)/B1). Further, the time reduction calculation unit 115 calculates "46" obtained by adding "40" which is the value of "L1" to the calculated value "6" as the value of "T1".

Subsequently, the time reduction calculation unit 115 calculates "1.5" which is a value obtained by dividing a value obtained by subtracting "8" which is the value set to "Linesize" from "32" which is the value set to the "size" corresponding to the information of which the "number" is "1" by "16" which is the value of "B2" based on Expression (3). Moreover, since "1.5" is larger than "0" the time reduction calculation unit 115 calculates "1.5" as the value of max(0,(x−Linesize)/B2). Further, the time reduction calculation unit 115 calculates "41.5" obtained by adding "40" which is the value of "L2" to the calculated value "1.5" as the value of "T2".

Moreover, the time reduction calculation unit 115 calculates "4.5" obtained by subtracting "41.5" which is the value of "T2" from "46" which is the value of "T1" as a time reduction in the memory access when the data corresponding to the information of which the "number" is "2" is moved from the first memory 101 to the second memory 102.

Further, since "1" is set to the "access frequency", the time reduction calculation unit 115 calculates "4.5" obtained by multiplying "1" by the calculated value "4.5". In this way, the time reduction calculation unit 115 can calculate "4.5" as a total time reduction in memory accesses when the data corresponding to the information of which the "number" is "2" is moved from the first memory 101 to the second memory 102.

Returning to FIG. 11, the time reduction calculation unit 115 sets the total time reduction calculated in S52 to the correlation information 134 (S53).

FIG. 17 is a specific example of the correlation information 134 when the total time reduction calculated in S52 is set. Specifically, as illustrated in FIG. 17, the time reduction calculation unit 115 sets "4.5" which is the total time reduction calculated in S52 to the "time reduction" corresponding to the information of which the "address" is "0x000000010".

After that, as illustrated in FIG. 18, the time reduction calculation unit 115 calculates a total time reduction in memory accesses based on all items of information included in the correlation information 134 and sets the total time reduction to the "time reduction". The description of the other information of FIG. 18 will be omitted.

[Details of Process of S5]

Next, the details of the process of S5 described in FIG. 7 will be described.

Figure 12:
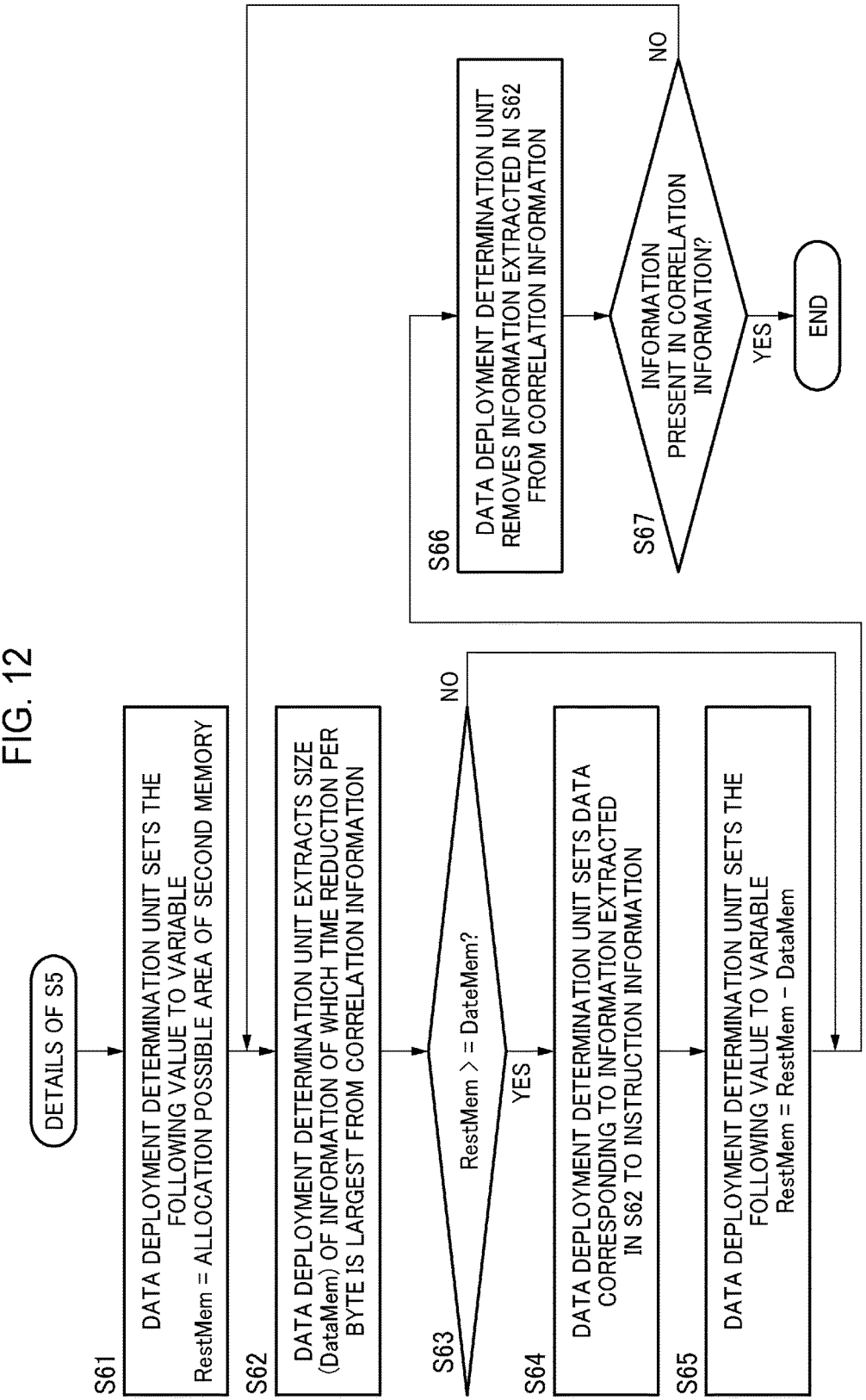
FIG. 12 is a flowchart for describing the details of the data deployment determination process according to the first embodiment.

As illustrated in FIG. 12, the data deployment determination unit 116 of the information processing device 10 sets initial values to respective variables (S61).

Specifically, the data deployment determination unit 116 sets the size of an area (hereinafter referred to as an allocation possible area) to which new data can be allocated within the second memory 102 to "RestMem". In the following description, it is assumed that the allocation possible area of the second memory 102 is 48 (bytes), and the data deployment determination unit 116 sets "48" to the "RestMem" in S61.

Subsequently, the data deployment determination unit 116 extracts the "size" of the Information of which the "time reduction" per byte is the largest from the correlation information 134 and sets the "size" to the "DataMem" (S62).

Specifically, in the case of the correlation information 134 illustrated in FIG. 18, the "time reduction" corresponding to the information of which the "number" is "2" is "4.5" and the "size" is "32". Thus, the "time reduction" per byte corresponding to the information of which the "number" is "2" is "0.14" (the last two digits are effective numbers) obtained by dividing "4.5" which is the "time reduction" by "32" which is the "size".

Moreover, in the case of the correlation information 134 illustrated in FIG. 18, the "time reduction" corresponding to the Information of which the "number" is "4" is "1.5" and the "size" is "16". Thus, the "time reduction" per byte corresponding to the information of which the "number" is "4" is "0.093" (the last two digits are effective numbers) obtained by dividing "1.5" which is the "time reduction" by "16" which is the "size".

Further, in the case of the correlation information 134 illustrated in FIG. 18, since the "time reduction" corresponding to the respective items of information of which the "number" are "1", "3", and "5" is "0", the "time reduction" per byte corresponding to each information is "0". Thus, the data deployment determination unit 116 sets "32" which is the "size" corresponding to the information of which the "number" is "2" to the "DataMem".

Subsequently, the data deployment determination unit 116 compares the values set to the "RestMem" and "DataMem" (S63). Moreover, when the value set to "RestMem" is larger than the value set to "DataMem" (S63: YES), the data deployment determination unit 116 stores the data corresponding to the information extracted in S62 in the information storage area 130 as the instruction information 135 (S64).

FIG. 19 is a specific example of the instruction information 135 when the process of S64 is executed. The Instruction information 135 illustrated in FIG. 19 has the same items as the correlation information 134. Specifically, as illustrated in FIG. 19, the data deployment determination unit 116 includes the same information as the information of which the "number" is "2" in the correlation information 134 illustrated in FIG. 18 as the instruction information 135. That is, in this case, the data deployment determination unit 116 determines the data corresponding to the information of which the "number" is "2" in the correlation information 134 illustrated in FIG. 18 as the data to be stored in the second memory 102.

Returning to FIG. 12, the data deployment determination unit 116 sets the value acquired by subtracting the value set to "DataMem" from the value set to "RestMem" as a new value of "RestMem" (S65).

Specifically, in the example of the instruction information 135 illustrated in FIG. 19, "16" which is the value acquired by subtracting "32" which is the value set to "DataMem" from "48" which is the value set to "RestMem" as a new value of "RestMem".

On the other hand, when the value set to "RestMem" is smaller than the value set to "DataMem" (S63: NO), the data deployment determination unit 116 does not execute the processes of S64 and S65. That is, in this case, since a storing possible area of the second memory 102 is insufficient, the data deployment determination unit 116 determines that the data corresponding to the Information set to the "RestMem" are not able to be stored in the second memory 102.

Subsequently, the data deployment determination unit 116 removes the information extracted in S52 from the correlation information 134 (S66). Moreover, when no information is present in the correlation information 134 (S67: YES) after the information is removed in S66, the data deployment determination unit 116 ends the process of S5. On the other hand, when information is present in the correlation information 134 (S67: NO) after the information is removed in S66, the data deployment determination unit 116 executes the processes subsequent to S62 again.

Subsequently, the data deployment determination unit 116 extracts information of which the "time reduction" is the largest from the correlation information 134 from which the information is removed in S66 and sets the extracted information to the "DataMem" (S62). Specifically, in the case of the correlation information 134 illustrated in FIG. 18, the Information of which the "number" is "2" is already removed. Thus, the data deployment determination unit 116 sets "16" which is the "size" corresponding to the information (the information of which the "number" is "4") of which the "time reduction" per byte is "0.093" (the last two digits are effective numbers) to the "DataMem".

Moreover, since "16" which is the value set to "RestMem" is the same as "16" which is the value set to "DataMem" (S63: YES), the data deployment determination unit 116 stores the data corresponding to the information extracted in S62 in the information storage area 130 as the instruction information 135 (S64).

FIG. 20 is a specific example of the instruction information 135 when the process of S64 is executed in the state illustrated in FIG. 19. As illustrated in FIG. 20, the data deployment determination unit 116 sets information of which the "number" in the correlation information 134 illustrated in FIG. 18 is "4" as the instruction information 135.

Returning to FIG. 12, the data deployment determination unit 116 sets a value acquired by subtracting the value set to "DataMem" from the value set to "RestMem" as a new value of "RestMem" (S65).

Specifically, in the example of the instruction information 135 illustrated in FIG. 19, the data deployment determination unit 116 sets "0" which is a value acquired by subtracting "16" which is the value set to "DataMem" from "16" which is the value set to "RestMem" as a new value of "RestMem".

Here, since "0" is set to "RestMem" the data deployment determination unit 116 is not able to determine the new data as the data to be moved to the second memory 102 (S63: NO). Thus, the data deployment determination unit 116 ends the process of S5 after removing all items of information from the correlation information 134 (S66, S67). That is, the data deployment determination unit 116 determines that the data corresponding to the respective items of information of which the "number" are "1", "3", and "5" within the correlation information 134 illustrated in FIG. 18 is to be stored in the first memory 101.

In this manner, in the first embodiment, when a successive access has occurred in the trace information 132, the information processing device 10 acquires information from the trace information 132 as if memory accesses to the entire successive addresses have been performed collectively. Moreover, the information processing device 10 of the first embodiment calculates a time reduction in memory accesses when data stored in the first memory 101 is moved to the second memory 102 based on the acquired information. After that, the information processing device 10 of the first embodiment determines that the data of which the time reduction (the time reduction per byte, for example) in memory accesses is large s the data that is to be preferentially stored in the second memory 102.

In this way, the information processing device 10 can determine data deployment capable of improving the memory access efficiency even when successive accesses occur.

Second Embodiment

Next, a second embodiment will be described. FIGS. 23 to 26 are flowcharts for describing the details of a data deployment determination process according to the second embodiment. Moreover, FIGS. 21, 22 to 27, and 35 are diagrams for describing the details of the data deployment determination process according to the second embodiment. The details of the data deployment determination process illustrated in FIGS. 23 to 26 will be described with reference to FIGS. 12, 21, 22, and 27 to 35.

In the second embodiment, it is assumed that each bank in the first and second memories 101 and 102 has a Row buffer area (hereinafter also referred to as a buffer area). The Row buffer area is an area in which data in each bank subjected to previous memory access is stored (maintained).

Figure 21:
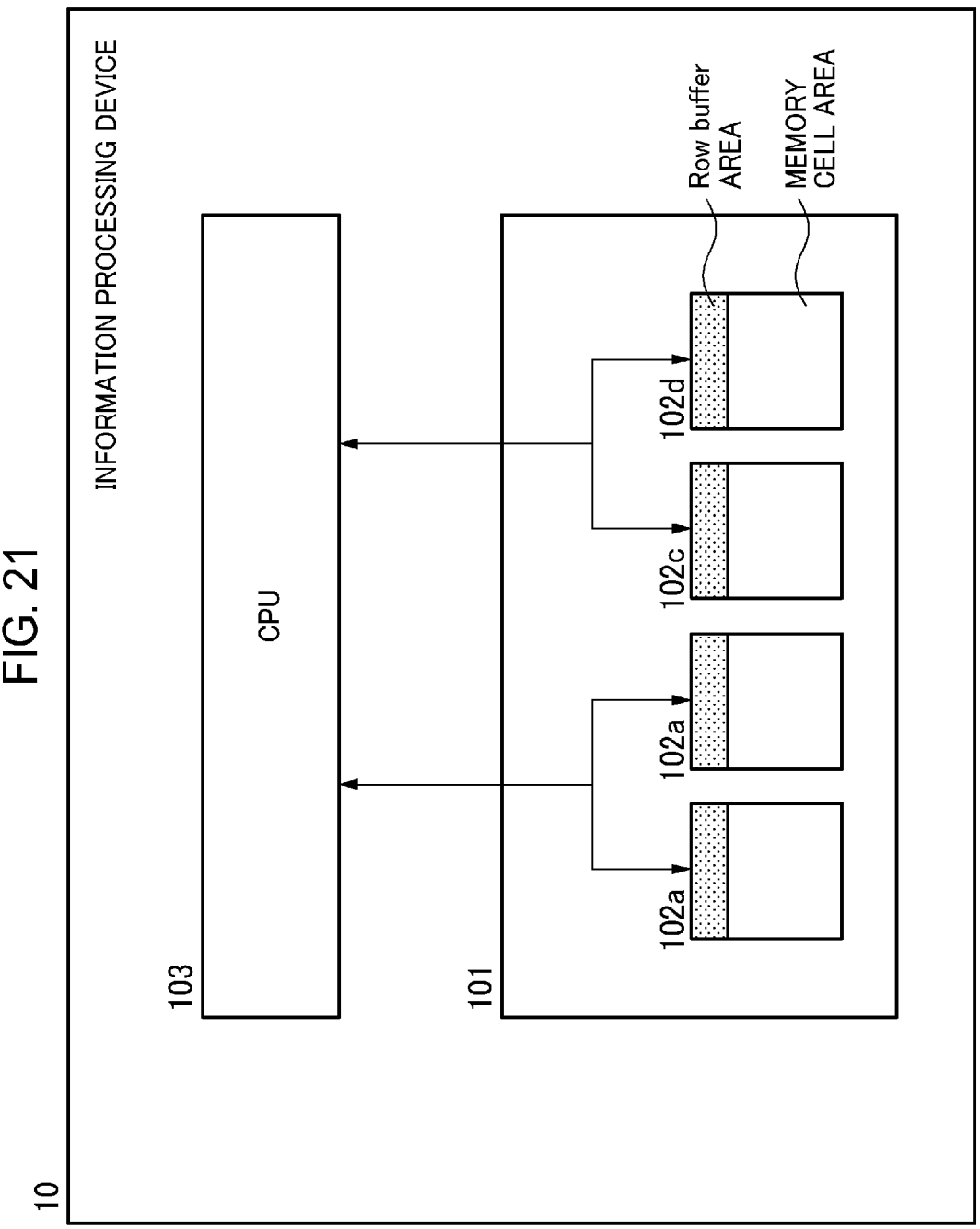
FIG. 21 is a diagram for describing a specific example of the first memory 101 according to the second embodiment.

FIG. 21 is a diagram for describing a specific example of the first memory 101 according to the second embodiment. In FIG. 21, the first memory 101 includes a bank 102a, a bank 102b, a bank 102c, and a bank 102d. Each bank has the Row buffer area.

Specifically, in the example illustrated in FIG. 21, when a memory access request for the data stored in the bank 102a is issued from the CPU 103, the first memory 101 refers to the Row buffer area in the bank 102a. Moreover, the first memory 101 determines whether the memory access target data is stored in the Row buffer area of the bank 102a.

As a result, when the memory access target data is stored in the Row buffer area of the bank 102a, the first memory 101 does not perform a memory access to the data stored in another area (hereinafter also referred to as a memory cell area) of the bank 102a. Moreover, the first memory 101 returns the memory access target data stored in the Row buffer area of the bank 102a to the CPU 103. On the other hand, when the memory access target data is not stored in the Row buffer area of the bank 102a, the first memory 101 performs a memory access to the data stored in the other area of the bank 102a. Moreover, in this case, the first memory 101 writes the memory access target data to the Row buffer area in the bank 102a and returns the memory access target data to the CPU 103.

That is, the higher the probability of the memory access target data being stored in the Row buffer area, the more efficiently the first memory 101 can perform the memory access. Due to this, in general, when memory access requests for the first memory 101 are accumulated, the memory access requester (the CPU 103) rearranges the order of the memory access requests so that the number of memory accesses for the data stored in the Row buffer area increases.

Thus, the information processing device 10 of the second embodiment determines the data to be stored in the second memory 102 by taking the rearrangement of the order of the memory access requests issued by the memory access requester into consideration. In this way, the information processing device 10 can determine the data deployment according to the state of memory accesses performed actually. In the following description, it is assumed that the first memory 101 stores all items of data of which a portion of the address is the same as that of the data subjected to memory accesses when the data subjected to memory accesses is stored in the Row buffer area.

Figure 22:
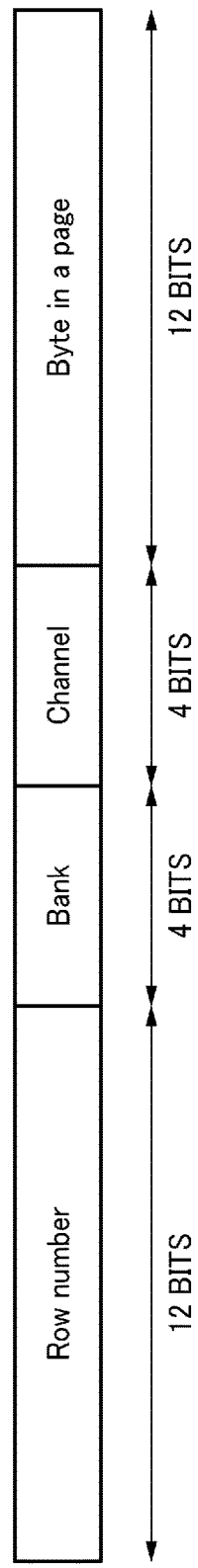
FIG. 22 is a specific example of an address designated when the CPU 103 performs memory accesses.

FIG. 22 is a specific example of an address designated when the CPU 103 performs memory accesses. The address illustrated in FIG. 22 includes "Row number" indicating the row of a memory cell in which data is stored and "Bank" Indicating the bank in which data is stored. Moreover, the address illustrated in FIG. 22 includes "Channel" for accessing a bank in which data is stored and "Byte in a page" that designates a column. In the address illustrated in FIG. 22, the "Row number" and the "Byte in a page" are 12 bits and the "Bank" and the "Channel" are 4 bits. Moreover, when the data subjected to memory accesses is stored in the Row buffer area, for example, the first memory 101 stores all items of data of which the "Row number", "Bank" and "Channel" are the same as those of the data subjected to memory accesses.

Since the processes of S1, S2, and S5 of FIG. 7 are the same as those of the first embodiment, the description thereof will not be provided. Moreover, a plurality of memory accesses occurring for items of data having the same "Row number", "Bank" and "Channel" will be also referred to simply as multiple accesses, and information indicating the occurrence of multiple accesses in the trace information 132 will be also referred to as multiple-access information.

[Details of Process of S3](Process of Rearranging Items of Information Included in Trace Information 132)

First, the details of the process of S3 described in FIG. 7 will be described.

Figure 23:
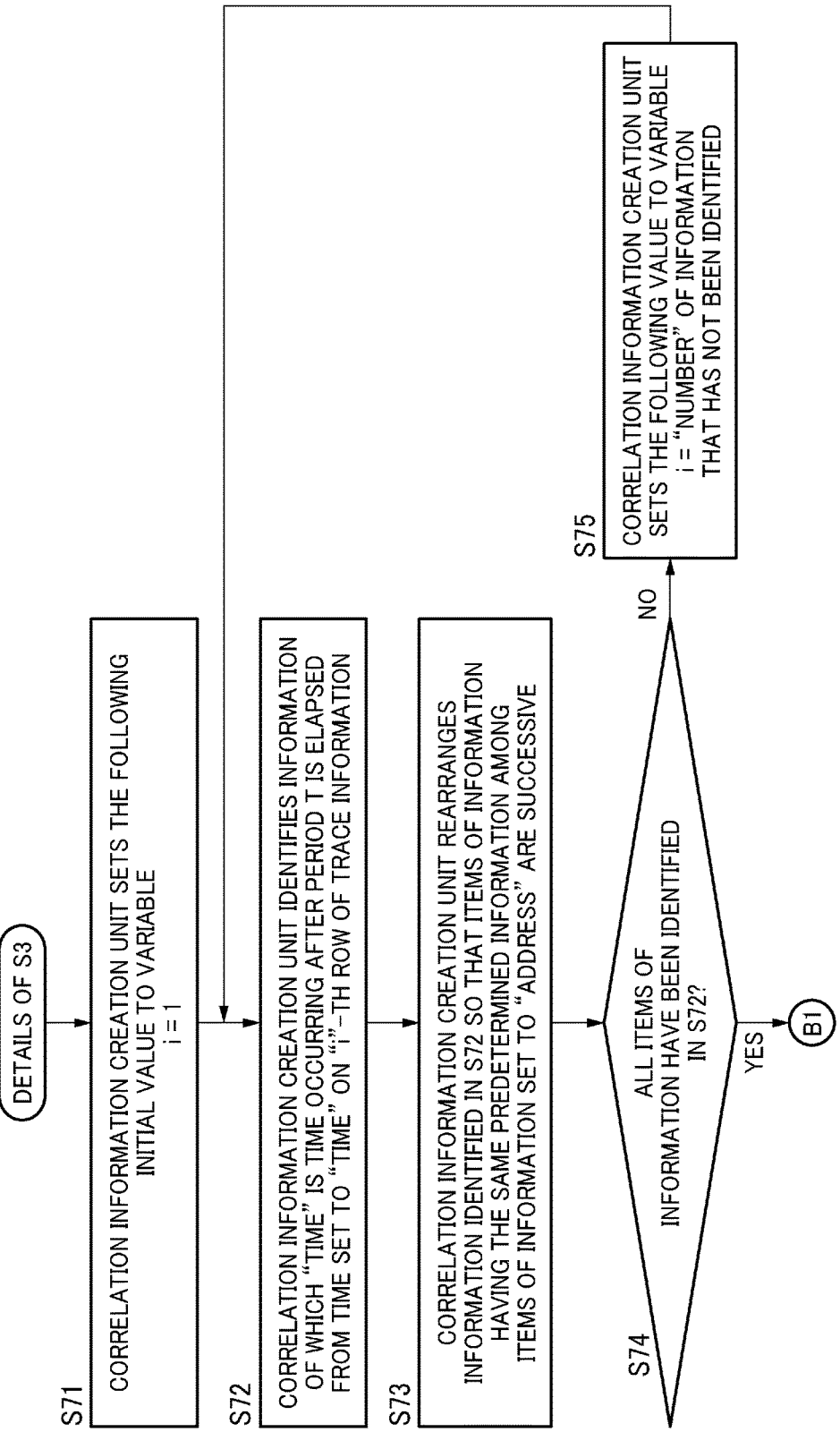
FIG. 23 is a flowchart for describing the details of a data deployment determination process according to the second embodiment.

As illustrated in FIG. 23, the correlation information creation unit 114 of the information processing device 10 sets initial values to respective variables (S71). Specifically, the correlation information creation unit 114 sets "1" to "i" indicating the row of the trace information 132.

Subsequently, the correlation information creation unit 114 identifies items of information of which the "time" is time occurring after the period T is elapsed from the time set to the "time" on the "i"-th row of the trace information 132 from the trace information 132 (S72). In the following description, it is assumed that the period T is 10 (msec).

In the example of the trace information 132 illustrated in FIG. 3, the time set to the "time" on the 1-st row is "0001". Thus, the correlation information creation unit 114 identifies items of information (information of which the "number" is between "1" and "7") having the "time" between "0001" and "0011".

Moreover, the correlation information creation unit 114 rearranges the items of information identified in S72 so that items of information of which the items of predetermined information are the same among the items of information set to the "address" of the trace information 132 are successive (S73). The predetermined information may be between 13 and 32 bits (the upper five digits in a hexadecimal notation) within the information set to the "address" of the trace information 132, for example. In the following description, it is assumed that the predetermined information is between 13 and 32 bits within the information set to the "address" of the trace information 132.

FIG. 27 is a specific example for describing the trace information 132 when the process of S73 is performed. In the example of the trace information 132 illustrated in FIG. 3, among the items of information of which the "number" are between "1" and "7", the upper five digits of the items of information set to the "address" of which the "number" are "1" and "7" are "00001" and the upper five digits of the items of Information set to the "address" of which the "number" are between "2" and "6" are "00000".

Thus, as illustrated in FIG. 27, the correlation information creation unit 114 rearranges the items of information included in the trace information 132 illustrated in FIG. 3 so that the items of information of which the "number" are between "2" and "6" are successive and the items of information of which the "number" are "1" and "7" are successive. In this way, the correlation information creation unit 114 can determine the data to be stored in the second memory 102 by taking the rearrangement of the orders of memory access requests into consideration.

Returning to FIG. 23, the correlation information creation unit 114 determines whether all items of information included in the trace information 132 have been identified in S72 (S74). Moreover, when it is determined that all items of information have not been identified (S74: NO), the correlation information creation unit 114 sets the "number" of the information that is not identified in S72 to "i" (S75). After that, the correlation information creation unit 114 executes the processes subsequent to S72 again.

Specifically, in the example of FIG. 27, the correlation information creation unit 114 has already identified the information of which the "number" is "7". Due to this, the correlation information creation unit 114 has not identified all items of information included in the trace information 132 in S72 (S74: NO). Thus, in this case, the correlation information creation unit 114 sets "8" to "i" (S75). Since the subsequent processes of FIG. 23 are the same as those described above, the description thereof will be omitted.

FIG. 28 is a specific example of the trace information 132 when all items of information have been identified in S72. In the trace information 132 illustrated in FIG. 28, the items of information of which the "number" are "9", "10", and "11" are rearranged as compared to the trace information 132 illustrated in FIG. 27 (see the underlined portions in FIG. 28). That is, the correlation information creation unit 114 rearranges the items of information included in the trace information 132 illustrated in FIG. 28 so that the items of information of which the upper five digits of the items of information set to the "address" are "00001" are successive and the items of information of which the upper five digits of the items of information set to the "address" are "20000" are successive (Process of Creating Correlation Information 134)

Figure 24:
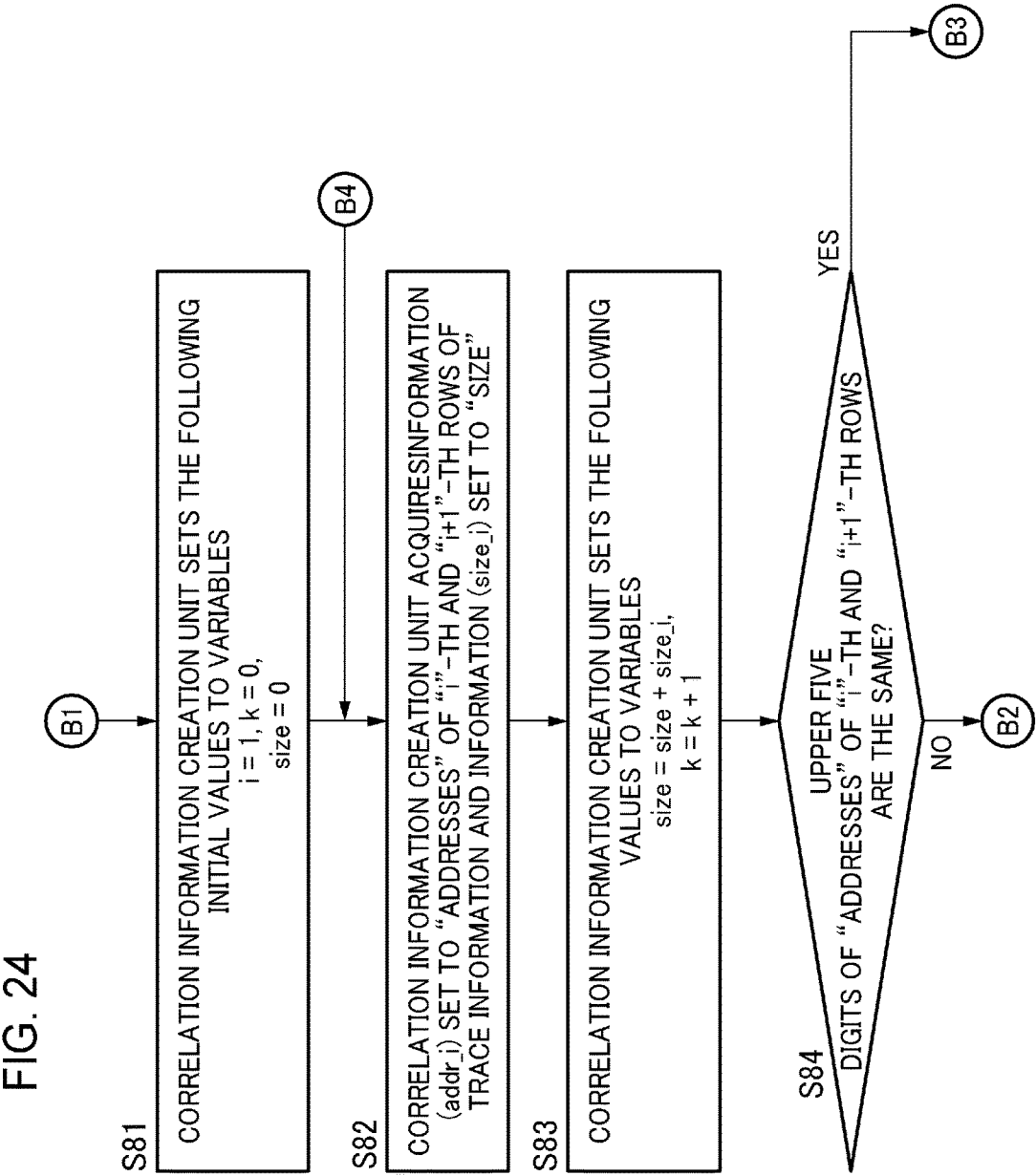
FIG. 24 is a flowchart for describing the details of a data deployment determination process according to the second embodiment.

On the other hand, when all items of information included in the trace information 132 have been identified (S74: YES), the correlation information creation unit 114 sets initial values to respective variables as illustrated in FIG. 24 (S81).

Specifically, the correlation information creation unit 114 sets "1" to "i" Indicating the row of the trace information 132 and sets "0" to "k" which is the frequency information of memory accesses. Moreover, the correlation information creation unit 114 sets "0" to "size" which is a total size of items of data subjected to memory accesses during a period in which successive accesses for items of data in areas of which the upper five digits of information set to the "address" are the same occur.

(Process when "i" is "1")

Subsequently, the correlation information creation unit 114 acquires "addr_i" and "size_i" from the trace information 132 (S82). Moreover, the correlation information creation unit 114 acquires "addr_i+1" and "size_i+1" from the trace information 132 (S82).

Specifically, in the trace information 132 illustrated in FIG. 28, the correlation information creation unit 114 acquires "0x00000010" which is the "address" set in correspondence to a row of which the "number" is "2" as "addr_1". Moreover, in the trace information 132 illustrated in FIG. 28, the correlation information creation unit 114 acquires "8" which is the "size" set in correspondence to a row of which the "number" is "2" as "size_1". Similarly, the correlation information creation unit 114 acquires "0x00000018" which is the "address" set in correspondence to a row of which the "number" is "3" as "addr_2". Moreover, in the trace information 132 illustrated in FIG. 28, the correlation information creation unit 114 acquires "8" which is the information set to "size" corresponding to a row of which the "number" is "3" as "size_2".

Moreover, the correlation information creation unit 114 performs to add the value set to the "size_i" to the value set to the "size" (S83). Moreover, the correlation information creation unit 114 performs to add "1" to the value set to "k" (S83).

Specifically, when the information of the first row of the trace information illustrated in FIG. 28 is acquired, the correlation information creation unit 114 adds "8" which is the value of "size_1" to "0" which is the value of "size" and sets "8" as a new value of "size". Moreover, when the information of the first row of the trace information illustrated in FIG. 28 is acquired, the correlation information creation unit 114 adds "1" to "0" which is the value of "k" and sets "1" as a new value of "k".

Figure 25:
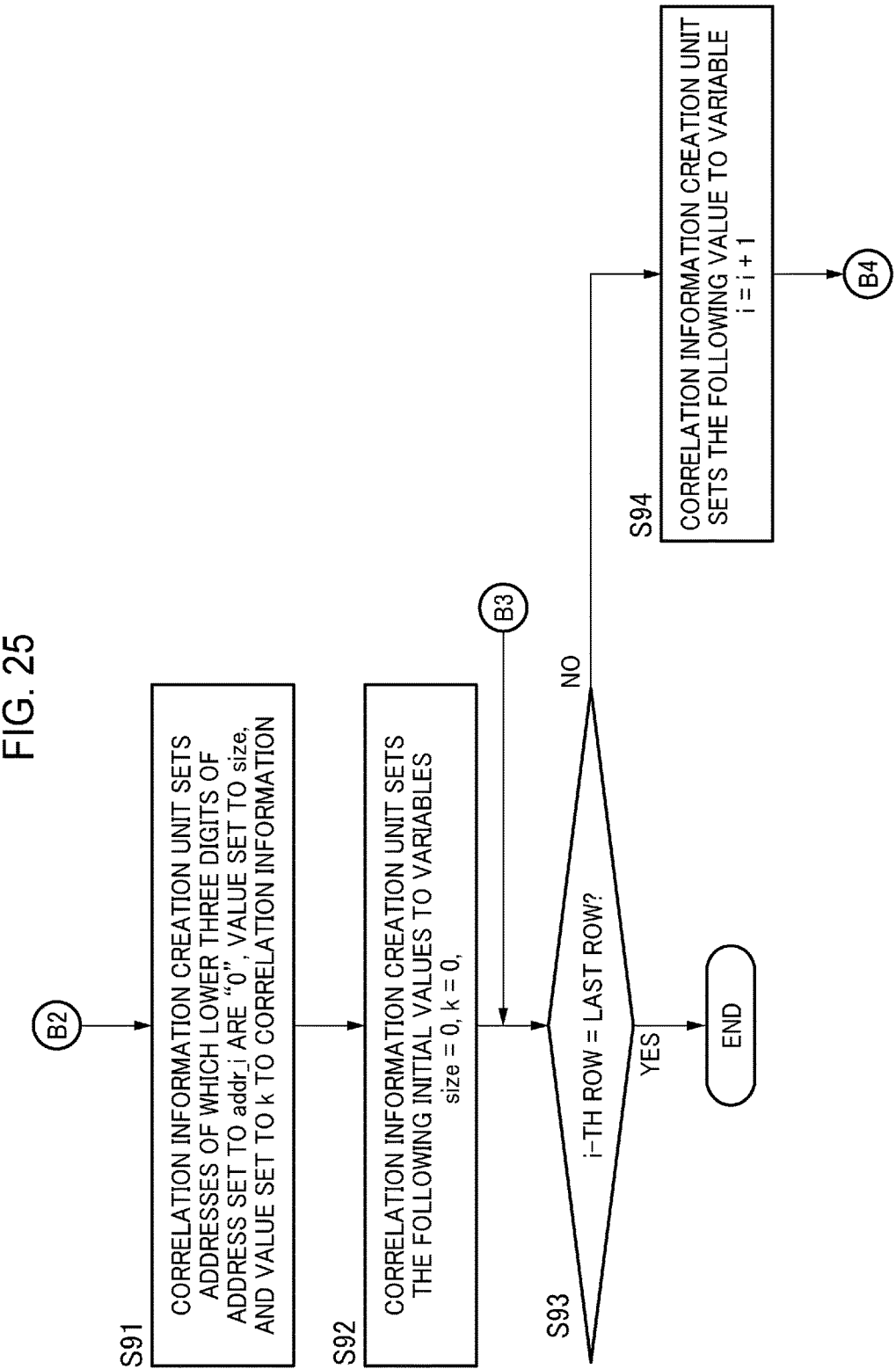
FIG. 25 is a flowchart for describing the details of a data deployment determination process according to the second embodiment.

Subsequently, the correlation information creation unit 114 determines whether the upper five digits of the "addr_i" acquired from the trace information 132 in S82 are the same as the upper five digits of "addr_i+1" (S84). When it is determined that the upper five digits of the "addr_i" acquired from the trace information 132 in S82 are not the same as the upper five digits of "addr_i+1" (S84: NO), the correlation information creation unit 114 sets the correlation information 134 as illustrated in FIG. 25 (S91). In this case, the correlation information creation unit 114 correlates the address which is set to "addr_i" and of which the lower three digits are "0" the value set to "size" and the value set to "k" and sets the same in the information storage area 130 as the correlation information 134.

After that, the correlation information creation unit 114 updates the values of the respective variables (S92). Specifically, the correlation information creation unit 114 sets "0" to "k" and "0" to "size". That is, the correlation information creation unit 114 initializes the respective variables when the information acquired from the trace information 132 is reflected on the correlation information 134.

On the other hand, when it is determined that the upper five digits of "addr_i" are the same as the upper five digits of "addr_i+1" (S84: YES), the correlation information creation unit 114 does not execute the processes of S91 and S92.

Specifically, in the example of FIG. 28, the upper five digits of "0x00000010" of the value of "addr_1" and the upper five digits of "0x00000018" which is the value of "addr_2" both are "00000" Thus, the correlation information creation unit 114 determines that the upper five digits of "addr_i" are the same as the upper five digits of "addr_i+1" (S84: YES).

Subsequently, the correlation information creation unit 114 determines whether the "i"-th row of the trace information 132 is the last row (S93). When it is determined that the "i"-th row is not the last row (S93: NO), the correlation information creation unit 114 adds "1" to "i" (S94).

Specifically, the trace information 132 illustrated in FIG. 28 has up to the 11-th row of information. Thus, the correlation information creation unit 114 determines that the 1-st row is not the last row (S93: NO), and updates the value "i" to "2" (S94).

On the other hand, when it is determined that the "i"-th row is the last row (S93: YES), the correlation information creation unit 114 ends the process of S3. Since the processes when "i" is between "2" and "4" are the same as the processes when "i" is "1", the description thereof will be omitted.

(Process when "i" is "5")

Next, the process when "i" is "5" will be described.

In this case, the correlation information creation unit 114 acquires "0x00000078" as "addr_5" and acquires "0x00001000" as "addr_6" (S82). Here, "00000" which are the upper five digits of "0x00000078" are not the same as "00001" which are the upper five digits of "0x00001000" (S84: NO).

Thus, the correlation information creation unit 114 correlates "0x00000000" in which the lower three digits of "0x00000078" which is the value of "addr_5" are "000" "40" which is the value of "size" and "5" which is the value of "k" and sets the same as the correlation information 134 (S91).

Specifically, as illustrated in FIG. 29, the correlation information creation unit 114 sets "0x00000000", "5" which is the value of "k", and "40" which is the value of "size" in correlation with the information of which the "number" is "1" as "address", "access frequency", and "size" respectively.

Moreover, the correlation information creation unit 114 sets "0" to "k" and sets "*" to "size" (S92). Since the subsequent processes of S3 are the same as those described above, the description thereof will be omitted.

FIG. 30 is a specific example of the correlation information 134 based on all items of information included in the trace information illustrated in FIG. 28. In the trace information 132 illustrated in FIG. 28, both the upper five digits of the items of information set to the "address" corresponding to the items of information of which the "number" are "1" and "7" and the upper five digits of the items of information set to the "address" corresponding to the items of information of which the "number" are "8" and "11" are "00001" However, the time set to the "time" corresponding to the Items of information of which the "number" are "8" and "11" occurs the period T (10 (ms)) or longer after the time set to the "time" corresponding to the information of which the "number" is "1". Thus, the correlation information creation unit 114 summarizes the information of which the "number" is "2" and the information of which the "number" is "3" as different items of Information in the correlation information 134 illustrated in FIG. 30.

[Details of Process of S4]

Next, the details of the process of S4 described in FIG. 7 will be described.

Figure 26:
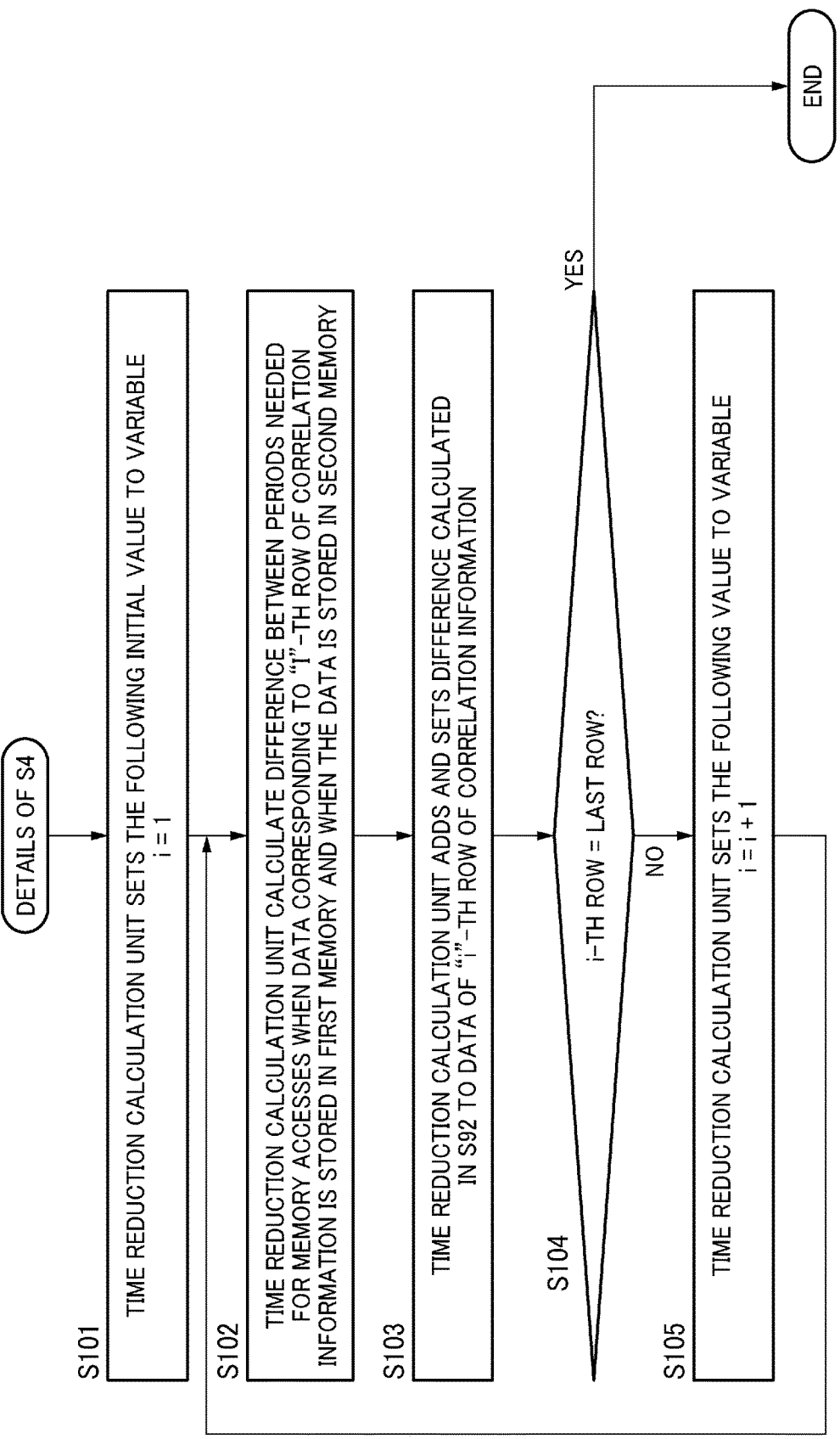
FIG. 26 is a flowchart for describing the details of a data deployment determination process according to the second embodiment.

The time reduction calculation unit 115 of the information processing device 10 sets initial values to respective variables as illustrated in FIG. 26 (S101). Specifically, the time reduction calculation unit 115 sets "1" to "i".

The time reduction calculation unit 115 calculates a period needed for memory accesses when the data corresponding to the "i"-th row of the correlation information 134 is stored in the first memory 101. Moreover, the time reduction calculation unit 115 calculates a period needed for a memory access when the data corresponding to the "i"-th row of the correlation information 134 is stored in the second memory 102. Moreover, the time reduction calculation unit 115 calculates a difference (time reduction) in the calculated periods needed for the memory accesses (S102). That is, in the process of S4 of the second embodiment, the time reduction for each item of data (of the "Row number", "Bank" and "Channel" are the same) stored in the Row buffer area is calculated.

In the following description, it is assumed that the period needed for memory accesses when memory access target data is present in the Row buffer area of the first memory 101 is 20 (ms). Moreover, it is assumed that the period needed for memory accesses when memory access target data is not present in the Row buffer area of the first memory 101 is 40 (ms). Further, it is assumed that the period needed for memory accesses when memory access target data is present in the Row buffer area of the second memory 102 is 8 (ms). Further, it is assumed that the period needed for memory accesses when memory access target data is not present in the Row buffer area of the second memory 102 is 30 (ms). The periods needed for these memory accesses may be calculated based on Expressions (2) and (3), for example.

Specifically, the "access frequency" corresponding to the information of which the "number" in the correlation information 134 illustrated in FIG. 30 is "1" is "5". Thus, the time reduction calculation unit 115 calculates the time reduction assuming that memory access target data of the first memory access among the five memory accesses is not present in the Row buffer area. On the other hand, the time reduction calculation unit 115 calculates the time reduction assuming that the items of memory access target data of the other (four) memory accesses other than the first memory access among the five memory accesses is present in the Row buffer area.

Thus, the time reduction calculation unit 115 determines that a total period needed for memory accesses to the data corresponding to the information of which the "number" in the correlation information 134 of FIG. 30 is "1" is 120 which is the sum of 40, 20, 20, 20, and 20 when the data is stored in the first memory 101. Moreover, the time reduction calculation unit 115 determines that the total period is 62 which is the sum of 30, 8, 8, 8, and 8 when the data is stored in the second memory 102. Further, the time reduction calculation unit 115 determines that the difference in the periods needed for the memory accesses when the data corresponding to the information of which the "number" is "1" is moved from the first memory 101 to the second memory 102 is 58 which is a subtraction of 62 from 120.

As illustrated in FIG. 31, the time reduction calculation unit 115 sets "58" to the "time reduction" corresponding to information of which the "number" is "1" (S103). Moreover, the time reduction calculation unit 115 may set "1.45" which is a value obtained by dividing "58" which is the value set to the "time reduction" by "40" which is the value set to the "size" as "time reduction per byte".

Returning to FIG. 26, the time reduction calculation unit 115 determines whether the "i"-th row is the last row (S104). Moreover, when the "i"-th row is the last row (S104: YES), the time reduction calculation unit 115 ends the process of S4. On the other hand, when the "i"-th row is not the last row (S104: NO), the time reduction calculation unit 115 adds "1" to the value set to "i" (S105) and executes the processes subsequent to S102 again.

Specifically, when the value set to "i" is "1", the "i"-th row is not the last row. Thus, the time reduction calculation unit 115 sets "2" obtained by adding "1" to "1" which is the value of "i" as a new value of "i".

After that, as illustrated in FIG. 32, the time reduction calculation unit 115 calculates the time reduction of memory accesses for all items of information included in the correlation information 134 and sets the calculated time reduction as "time reduction" Description of the information illustrated in FIG. 32 will be omitted.

In this manner, in the second embodiment, the information processing device 10 rearranges items of information included in the trace information 132 in order to increase the probability of memory access target data being stored in the Row buffer area. By doing so, the information processing device 10 can determine data deployment capable of improving the memory access efficiency even when the first and second memories 101 and 102 are memories having a Row buffer area.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data deployment determination apparatus comprising:
when successive access information indicating that successive memory accesses are performed on data stored in successive addresses is included in trace information on a memory access to the first memory, a correlation information creation processor that creates correlation information in which addresses indicating areas in a first memory, in which data subjected to memory accesses is stored, are correlated with frequency information on memory accesses to the respective addresses, from the trace information, the data subjected to memory accesses including data stored in successive addresses in which successive memory accesses are performed;
a time reduction calculation processor that calculates, for each of the addresses, time reduction in memory accesses to data stored in the first memory based on the correlation information when data stored in the first memory is stored in a second memory which is a memory having a larger bandwidth than the first memory; and
a data deployment determination processor that determines that first data stored in the address of which the time reduction is larger than the time reduction corresponding to second data stored in the address is to be stored in the second memory in preference to the second data.

2. The data deployment determination apparatus according to claim 1, wherein the correlation information creation processor creates the correlation information by correlating a size of the data subjected to memory accesses with the addresses and the frequency information.

3. The data deployment determination apparatus according to claim 1, wherein
when successive access information indicating that successive memory accesses are performed on data stored in successive addresses is included in the trace information, the correlation information creation processor creates the correlation information by correlating the successive addresses with frequency information on the successive memory accesses for the successive addresses, and
the time reduction calculation processor calculates, for every the successive addresses, the time reduction in memory accesses to data stored in the first memory when data stored in the first memory is stored in the second memory.

4. The data deployment determination apparatus according to claim 3, wherein the successive access information is information indicating that successive memory accesses are performed so that addresses subjected to the memory accesses are in an ascending or descending order.

5. The data deployment determination apparatus according to claim 1, wherein
the first and second memories each include a buffer area that keeps data stored in a predetermined area, in the first memory, including the address of data subjected to memory accesses,
when a memory access is performed and memory-access target data is kept in the buffer area, the first and second memories returns the kept data, when the memory access is performed and the memory-access target data is not kept in the buffer area, the first and second memories stores data stored in a predetermined area including an address of the memory-access target data in the buffer area and returns data stored in the buffer area,
when multiple-access information indicating that a plurality of memory accesses are performed on data stored in the same predetermined area is included in the trace information, the correlation information creation processor rearranges items of information included in the trace information as if the plurality of memory accesses are successively performed, and creates the correlation information from the rearranged trace information by correlating the addresses of items of data stored in the predetermined area with the frequency information on memory accesses for the addresses of the items of data stored in the predetermined area, and
the time reduction calculation processor calculates, for every the addresses of the items of data stored in the predetermined area, the time reduction in memory accesses to data stored in the first memory when data stored in the first memory is stored in the second memory.

6. The data deployment determination apparatus according to claim 5, wherein the multiple-access information is information indicating that a plurality of memory accesses are performed on the data stored in the same predetermined area within a predetermined period.

7. The data deployment determination apparatus according to claim 1, wherein the data deployment determination processor determines that the first data stored in the address of which a value obtained by multiplying the time reduction and the frequency information corresponding to the address is larger than the value to the second data is to be stored in the second memory in preference to the second data.

8. A data deployment determination method comprising:
when successive access information indicating that successive memory accesses are performed on data stored in successive addresses is included in trace information on a memory access to the first memory, creating, by a processor, correlation information in which addresses indicating areas in a first memory, in which data subjected to memory accesses is stored, are correlated with frequency information on memory accesses to the respective addresses, from the trace information, the data subjected to memory accesses including data stored in successive addresses in which successive memory accesses are performed;
calculating, by a processor, for each of the addresses, time reduction in memory accesses to data stored in the first memory based on the correlation information when data stored in the first memory is stored in a second memory which is a memory having a larger bandwidth than the first memory; and
determining, by a processor, that first data stored in the address of which the time reduction is larger than the time reduction corresponding to second data stored in the address is to be stored in the second memory in preference to the second data.

9. A non-transitory computer-readable storage medium storing therein a data deployment determination program for causing a computer to execute a process comprising:
when successive access information indicating that successive memory accesses are performed on data stored in successive addresses is included in trace information on a memory access to the first memory, creating correlation information in which addresses indicating areas in a first memory, in which data subjected to memory accesses is stored, are correlated with frequency information on memory accesses to the respective addresses, from the trace information, the data subjected to memory accesses including data stored in successive addresses in which successive memory accesses are performed;
calculating, for each of the addresses, a time reduction in memory accesses to data stored in the first memory based on the correlation information when data stored in the first memory is stored in a second memory which is a memory having a larger bandwidth than the first memory; and
determining that first data stored in the address of which the time reduction is larger than the time reduction corresponding to second data stored in the address is to be stored in the second memory in preference to the second data.

* * * * *